US012300210B2

(12) United States Patent
Murata et al.

(10) Patent No.: US 12,300,210 B2
(45) Date of Patent: May 13, 2025

(54) SIGNAL PROCESSING APPARATUS, SIGNAL PROCESSING METHOD, SIGNAL PROCESSING MODEL PRODUCTION METHOD, AND SOUND OUTPUT DEVICE

(71) Applicant: SONY GROUP CORPORATION, Tokyo (JP)

(72) Inventors: Yasunobu Murata, Tokyo (JP); Kohei Asada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 165 days.

(21) Appl. No.: 18/000,690

(22) PCT Filed: May 26, 2021

(86) PCT No.: PCT/JP2021/019901

§ 371 (c)(1),
(2) Date: Dec. 5, 2022

(87) PCT Pub. No.: WO2021/251136

PCT Pub. Date: Dec. 16, 2021

(65) Prior Publication Data

US 2023/0223001 A1 Jul. 13, 2023

(30) Foreign Application Priority Data

Jun. 11, 2020 (JP) ................................ 2020-101763

(51) Int. Cl.
*G10K 11/178* (2006.01)
*H04R 1/10* (2006.01)

(52) U.S. Cl.
CPC .. *G10K 11/17823* (2018.01); *G10K 11/17825* (2018.01); *G10K 11/17881* (2018.01);
(Continued)

(58) Field of Classification Search
CPC ... G10K 2210/1081; G10K 2210/3038; G10K 2210/3048; G10K 2210/3024; G10K 2210/30351; H04R 2460/01
See application file for complete search history.

(56) References Cited

U.S. PATENT DOCUMENTS

| | | | | |
|---|---|---|---|---|
| 9,792,893 | B1 | 10/2017 | Gauger et al. | |
| 2015/0264469 | A1* | 9/2015 | Murata ............ | G10K 11/17821 381/71.1 |
| 2021/0304725 | A1* | 9/2021 | Kannan ............ | G10K 11/17813 |

FOREIGN PATENT DOCUMENTS

| | | | |
|---|---|---|---|
| JP | 2010-259008 | A | 11/2010 |
| JP | 2011-015080 | A | 1/2011 |

(Continued)

OTHER PUBLICATIONS

International Search Report and Written Opinion of PCT Application No. PCT/JP2021/019901, issued on Aug. 3, 2021, 10 pages of ISRWO.

*Primary Examiner* — Ping Lee
(74) *Attorney, Agent, or Firm* — CHIP LAW GROUP

(57) ABSTRACT

Provided is a signal processing apparatus including an acquisition unit that acquires an acoustic characteristic in a user's ear, isolated from the outside world and an NC filter unit that generates sound data having a phase opposite to an ambient sound leaking into the user's ear. The signal processing apparatus further includes a correction unit that corrects the sound data by using a correction filter and a determination unit that determines a filter coefficient of the correction filter based on the acoustic characteristic.

14 Claims, 32 Drawing Sheets

(52) U.S. Cl.
CPC ... *H04R 1/1083* (2013.01); *G10K 2210/1081* (2013.01); *G10K 2210/3011* (2013.01); *G10K 2210/3026* (2013.01); *G10K 2210/3027* (2013.01); *G10K 2210/3028* (2013.01); *G10K 2210/3038* (2013.01); *G10K 2210/3044* (2013.01); *G10K 2210/3048* (2013.01); *H04R 2460/01* (2013.01)

(56) References Cited

FOREIGN PATENT DOCUMENTS

| | | |
|---|---|---|
| JP | 2016-015585 A | 1/2016 |
| JP | 2019-054337 A | 4/2019 |

* cited by examiner

FIG.18A

| | A.JEITA |
|---|---|
| N.STANDARD | |
| O.UNKNOWN | |

FIG.18B

| | A.JEITA | **B.TRAIN** |
|---|---|---|
| N.STANDARD | | |
| O.UNKNOWN | | **0.55** |

FIG.18C

| | A.JEITA | **C.BUS** |
|---|---|---|
| N.STANDARD | | |
| O.UNKNOWN | | **0.60** |

FIG.21A

| | a-n A.JEITA |
|---|---|
| N.STAND-ARD | |
| O.UN-KNOWN | |

FIG.21B

| | a-n A.JEITA | **a-n B.TRAIN** |
|---|---|---|
| N.STAND-ARD | | |
| O.UN-KNOWN | | **0.62** |

FIG.21C

| | a-n A.JEITA | a-n B.TRAIN | **b-n B.TRAIN** |
|---|---|---|---|
| N.STAND-ARD | | | |
| O.UN-KNOWN | | 0.62 | **0.72** |

FIG.22A

| | a-n A.JEITA | a-n B.TRAIN | b-n B.TRAIN |
|---|---|---|---|
| N.STAND-ARD | | | |
| O.UN-KNOWN | | 0.62 | **0.71** |

FIG.22B

| | a-n A.JEITA | a-n B.TRAIN | b-n B.TRAIN | b-n C.BUS |
|---|---|---|---|---|
| N.STAND-ARD | | | | |
| O.UN-KNOWN | | 0.62 | 0.71 | **0.66** |

FIG.22C

| | a-? A.JEITA | a-? B.TRAIN | b-? B.TRAIN | b-? C.BUS |
|---|---|---|---|---|
| N.STAND-ARD | | | | |
| O.UN-KNOWN | | | | |
| **P.NO** | **0.66@a-n 0.77@a-p** | | | |

FIG.23A

| | a-? A.JEITA | a-? B.TRAIN | b-? B.TRAIN | b-? C.BUS |
|---|---|---|---|---|
| N.STAND-ARD | | | | |
| O.UN-KNOWN | | | | |
| P.NO | 0.77 | | **0.78** | **0.70** |

FIG.23B

| | a-? A.JEITA | a-? B.TRAIN | b-? B.TRAIN | b-? C.BUS | **b-? D.AIR-PLANE** |
|---|---|---|---|---|---|
| N.STAND-ARD | | | | | |
| O.UN-KNOWN | | | | **0.58** | **0.62** |
| P.NO | 0.77 | | 0.78 | 0.70 | |

FIG.23C

| | a-? A.JEITA | a-? B.TRAIN | b-? B.TRAIN | b-? C.BUS | b-? D.AIR-PLANE |
|---|---|---|---|---|---|
| N.STAND-ARD | | | | | |
| O.UN-KNOWN | | | | 0.58 | 0.62 |
| P.NO | 0.77 | | 0.78 | 0.70 | |
| **Q. GLASSES** | **0.74** | | **0.66@b-p 0.77@b-q** | | |

FIG.23D

| | a-? A.JEITA | a-? B.TRAIN | b-? B.TRAIN | b-? C.BUS | b-? D.AIR-PLANE |
|---|---|---|---|---|---|
| N.STAND-ARD | | | | | |
| O.UN-KNOWN | | | | 0.58 | 0.62 |
| P.NO | 0.77 | | 0.78 | 0.70 | |
| Q. GLASSES | **0.74** | | 0.77 | **0.70** | **0.78** |

FIG.26

120

| CORRECTION FILTER COEFFICIENT ID | CORRECTION FILTER COEFFICIENT | PERFORMING STATE | USE ENVIRONMENT 1 | USE ENVIRONMENT 2 | ... |
|---|---|---|---|---|---|
| NC11 | 0.55 | PERFORMING STATE #1 | USE ENVIRON-MENT #11 | USE ENVIRON-MENT #21 | ... |
| NC12 | 0.60 | PERFORMING STATE #2 | USE ENVIRON-MENT #12 | USE ENVIRON-MENT #22 | ... |
| ... | ... | ... | ... | ... | ... |

SIGNAL PROCESSING APPARATUS, SIGNAL PROCESSING METHOD, SIGNAL PROCESSING MODEL PRODUCTION METHOD, AND SOUND OUTPUT DEVICE

CROSS REFERENCE TO RELATED APPLICATIONS

This application is a U.S. National Phase of International Patent Application No. PCT/JP2021/019901 filed on May 26, 2021, which claims priority benefit of Japanese Patent Application No. JP 2020-101763 filed in the Japan Patent Office on Jun. 11, 2020. Each of the above-referenced applications is hereby incorporated herein by reference in its entirety.

FIELD

The present disclosure relates to a signal processing apparatus, a signal processing method, a signal processing program, a signal processing model production method, and a sound output device.

BACKGROUND

Recent spread of portable audio players promotes the spread of noise reduction systems that provide listeners (users) with good reproduced sound field spaces having reduced external environment noise, for sound output devices (e.g., headphones, earphones, etc.) used for the portable audio players.

In relation to the above technology, a technology has become widespread to suppress noise at a user's eardrum position by using a noise canceling (NC) filter.

CITATION LIST

Patent Literature

Patent Literature 1: JP 2016-015585 A

SUMMARY

Technical Problem

However, the conventional technology has room for promoting further improvement in usability. For example, in the conventional technology, although a signal at the eardrum position is sometimes required to maximize an amount of NC effect at the eardrum position, it is difficult to achieve arrangement of a microphone at the eardrum position due to the specifications of a product.

Therefore, the present disclosure proposes a new and improved signal processing apparatus, signal processing method, signal processing program, signal processing model production method, and sound output device that are configured to promote further improvement in usability.

Solution to Problem

According to the present disclosure, a signal processing apparatus is provided that includes: an acquisition unit that acquires an acoustic characteristic in a user's ear, isolated from the outside world; an NC filter unit that generates sound data having a phase opposite to an ambient sound leaking into the user's ear; a correction unit that corrects the sound data by using a correction filter; and a determination unit that determines a filter coefficient of the correction filter based on the acoustic characteristic.

BRIEF DESCRIPTION OF DRAWINGS

FIG. 18A is a diagram illustrating a procedure of a process of storing and referring to the correction filter according to an embodiment.

FIG. 18B is a diagram illustrating a procedure of a process of storing and referring to the correction filter according to an embodiment.

FIG. 18C is a diagram illustrating a procedure of a process of storing and referring to the correction filter according to an embodiment.

FIG. 21A is a diagram illustrating a procedure of a process of storing and referring to the correction filter according to an embodiment.

FIG. 21B is a diagram illustrating a procedure of a process of storing and referring to the correction filter according to an embodiment.

FIG. 21C is a diagram illustrating a procedure of a process of storing and referring to the correction filter according to an embodiment.

FIG. 22A is a diagram illustrating a procedure of a process of storing and referring to the correction filter according to an embodiment.

FIG. 22B is a diagram illustrating a procedure of a process of storing and referring to the correction filter according to an embodiment.

FIG. 22C is a diagram illustrating a procedure of a process of storing and referring to the correction filter according to an embodiment.

FIG. 23A is a diagram illustrating a procedure of a process of storing and referring to the correction filter according to an embodiment.

FIG. 23B is a diagram illustrating a procedure of a process of storing and referring to the correction filter according to an embodiment.

FIG. 23C is a diagram illustrating a procedure of a process of storing and referring to the correction filter according to an embodiment.

FIG. 23D is a diagram illustrating a procedure of a process of storing and referring to the correction filter according to an embodiment.

FIG. 26 is a table illustrating an example of a storage unit according to an embodiment.

DESCRIPTION OF EMBODIMENTS

Figure 1:
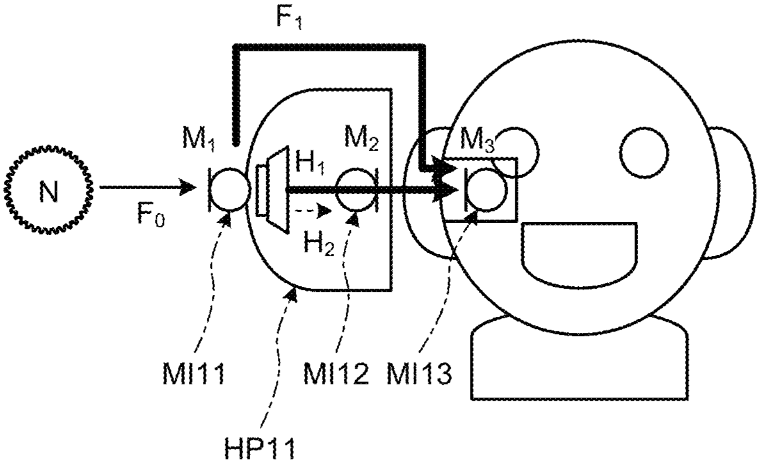
FIG. 1 is a diagram illustrating a configuration example for NC optimization according to an embodiment.

Preferred embodiments of the present disclosure will be described in detail below with reference to the accompanying drawings. Note that in the present description and the drawings, component elements having substantially the same functional configurations are denoted by the same reference numerals and symbols, and redundant descriptions thereof will be omitted.

Note that the description will be given in the following order.

1. One embodiment of present disclosure
1.1. Introduction
1.2. Personalized NC optimization
1.3. Configuration of signal processing system
2. Function of signal processing system
2.1. First DNN
2.2. Second DNN
2.3. Third DNN
2.4. Correction filter estimation process
2.5. Fourth DNN
2.6. Procedure of process
2.7. Storage of and reference to correction filter
2.8. Fifth DNN
2.9. Sixth DNN
2.10. Exemplary functional configuration
2.11. Process in signal processing system
2.12. Variations of processing
3. Exemplary hardware configuration
4. Conclusion

1. One Embodiment of Present Disclosure

<1.1. Introduction>

Physical characteristics, such as the head shape or ear size of a user, or external factors, such as the presence or absence of glasses or a hat can cause difference in volume or air density such as inside headphones. Therefore, when sound produced from a signal obtained after application of a noise reduction signal reaches a user's ear, the characteristics of the signal are changeable according to the volume and air density such as in the headphones, and thus, the characteristics of the signal may be different for different users. When the sound produced from the signal obtained after application of the noise reduction signal reaches the user's ear, the characteristics of the signal may be changed depending on a wearing condition of the headphones and the like, as well.

An NC filter having standard specifications (default) (hereinafter, appropriately referred to as "a default") that is mounted on a product may be defined according to a standard head shape or wearing condition in design. For this reason, during use by the user, an error may occur in the head shape and the wearing condition as compared with the default, and thus, no optimal NC effect is obtained in some cases. Therefore, there is room for promoting further improvement in usability.

Therefore, the present disclosure proposes a new and improved signal processing apparatus, signal processing method, and signal processing model production method that are configured to promote further improvement in usability.

<1.2. Personalized NC Optimization>

Personalized NC optimization will be described first. FIG. 1 is a diagram illustrating a configuration example for the personalized NC optimization. A microphone MI11 represents a feed forward (FF) NC microphone (hereinafter, appropriately referred to as "first microphone") that is arranged inside a headphones HP11. A microphone MI12 represents a feed back (FB) NC microphone (hereinafter, appropriately referred to as "second microphone") that is arranged inside the headphones HP11. A microphone MI13 represents a microphone (hereinafter, appropriately referred to as "third microphone") that is arranged at an eardrum position. An acoustic characteristic F0 represents an acoustic characteristic (spatial acoustic characteristic) of a noise source N to the first microphone. An acoustic characteristic F1 represents an acoustic characteristic from the first microphone to the third microphone. Note that the acoustic characteristic F1 is a leak-in characteristic from outside the headphones HP11. A device characteristic H1 represents an acoustic characteristic from a driver (speaker) of the headphones HP11 to the third microphone. A device characteristic H2 represents an acoustic characteristic from the driver to the second microphone of the headphones HP11. A microphone characteristic M1 represents a microphone characteristic of the first microphone. A microphone characteristic M2 represents a microphone characteristic of the second microphone. A microphone characteristic M3 represents a microphone characteristic of the third microphone.

Figure 2:
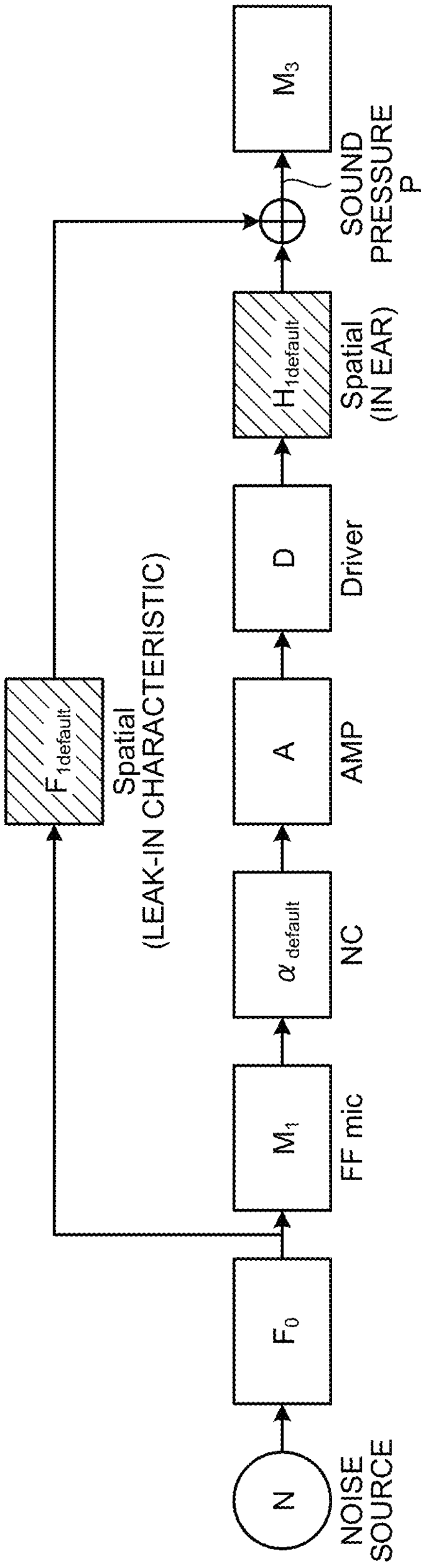
FIG. 2 is a diagram illustrating an overview of a function related to determination of an NC filter according to an embodiment.

Next, an overview of a function for the personalized NC optimization will be described. In FIG. 2, the NC filter that has a maximum amount of NC effect for the standard head shape or wearing condition in design is determined. This NC filter is the α default that is provided in the product. In FIG. 2, the α default is determined on the basis of the device characteristic H1 and acoustic characteristic F1 in design. The following Formula (1) shows a calculation formula for determining the α default.

$$\alpha_{default} = \frac{F_{1default}}{ADH_{1default}M_1} \tag{1}$$

(In the formula, F1 default represents the acoustic characteristic F1 in design, H1 default represents the device characteristic H1 in design.)

The device characteristic H1 and the acoustic characteristic F1 can be different between users. Therefore, it is also possible to perform the personal optimization by focusing on the device characteristic H1 and correcting H1 default M1 (hereinafter, appropriately referred to as "H1M1 characteristics") included in the above Formula (1) between the users. However, this personal optimization requires arrangement of a microphone near an eardrum, making it difficult to measure the device characteristic H1 in use environments of the users. Therefore, in the present embodiment, for example, the device characteristic H1 is estimated on the basis of similarity between the device characteristic H1 and the device characteristic H2, focusing on the device characteristic H2.

Figure 3A:
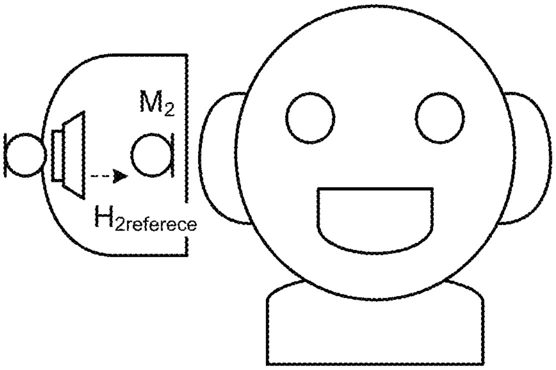
FIGS. 3A and 3B are diagrams illustrating configuration examples in design and use of the NC filter according to an embodiment.
Figure 3B:
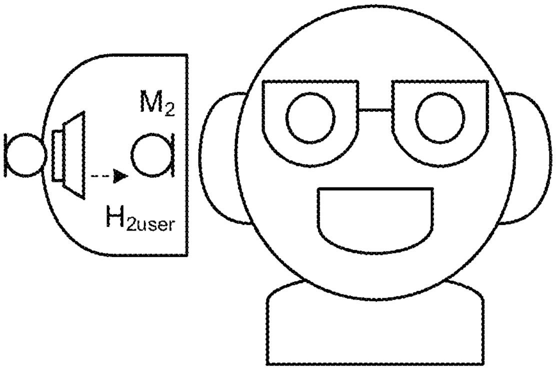

FIGS. 3A and 3B are diagrams illustrating configuration examples in design and use. A device characteristic H2 default represents the device characteristic H2 in design. A device characteristic H2 user represents the device characteristic H2 for which the personal optimization has been performed.

Figure 4:
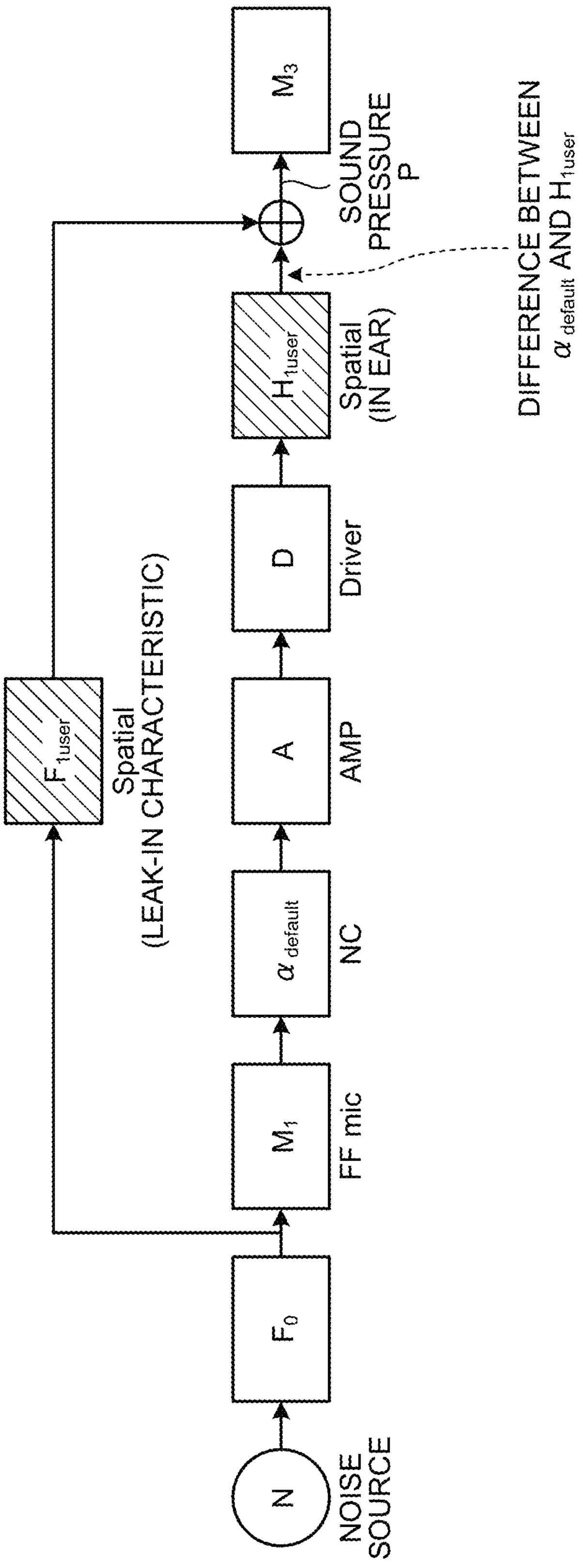
FIG. 4 is a diagram illustrating an overview of a function for NC optimization during use according to an embodiment.
Figure 5:
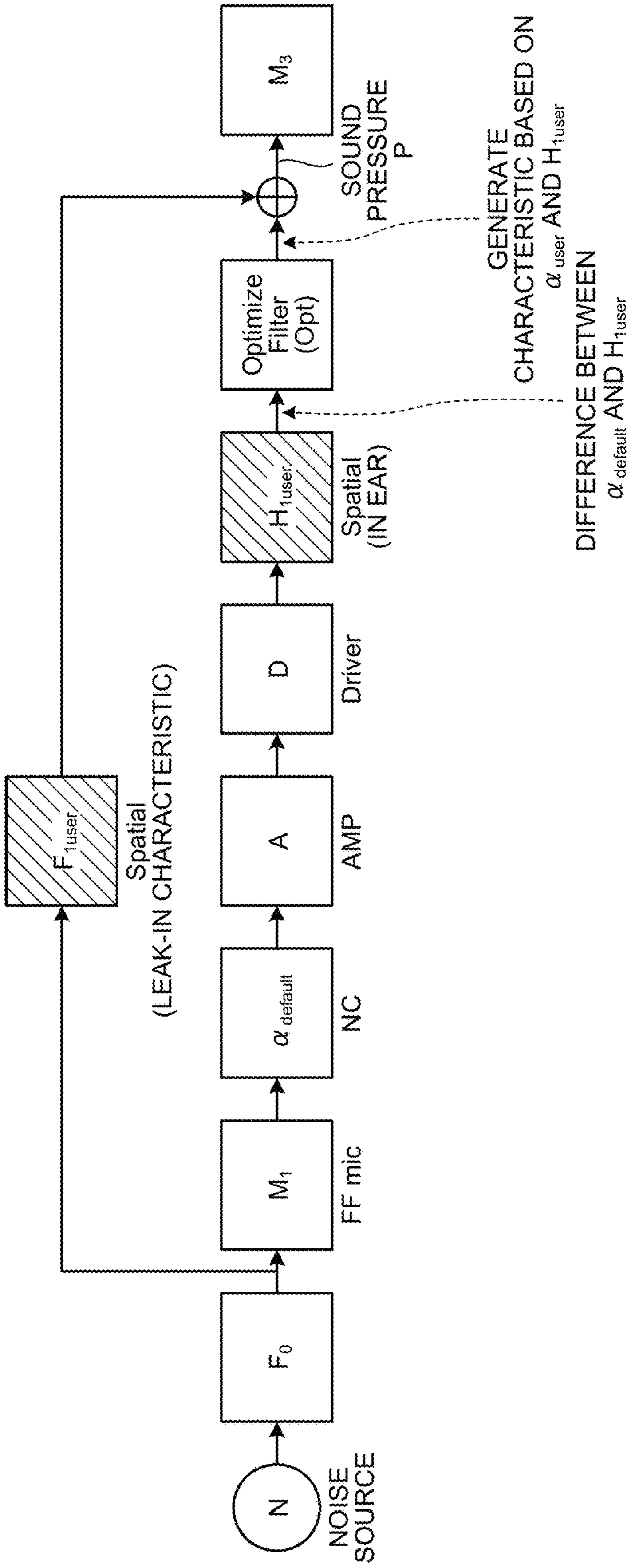
FIG. 5 is a diagram illustrating an overview of a function for NC optimization during use according to an embodiment.

Next, an overview of a function for the personalized NC optimization during use will be described with reference to FIGS. 4 and 5. Note that description similar to that in FIG. 2 will be omitted as appropriate. In addition, FIG. 2 illustrates use of the device characteristic H1 default as the device characteristic H1, but in FIGS. 4 and 5, a device characteristic H1 user is used. In FIG. 4, the standard a default is employed for the NC filter of the product. However, the acoustic characteristic can change according to the device characteristic H1 user obtained on the basis of the wearing condition of the user and the like. Therefore, in FIG. 5, the acoustic characteristic that can change in FIG. 4 is corrected. In FIG. 5, for example, focusing on the device characteristic H2 user, the correction is performed using a correction filter that cancels a difference between the device characteristic H2 user and the device characteristic H2 default. Note that, FIG. 5 illustrates, for convenience of description, the correction performed immediately after application of the device characteristic H1 user, but the correction may be performed before and after application of the α default, or the α default itself may be corrected. In addition, in an actual product, correction can often be performed by narrowing a band to approximately 100 Hz or less so as not to cause adverse effects.

Figure 6A:
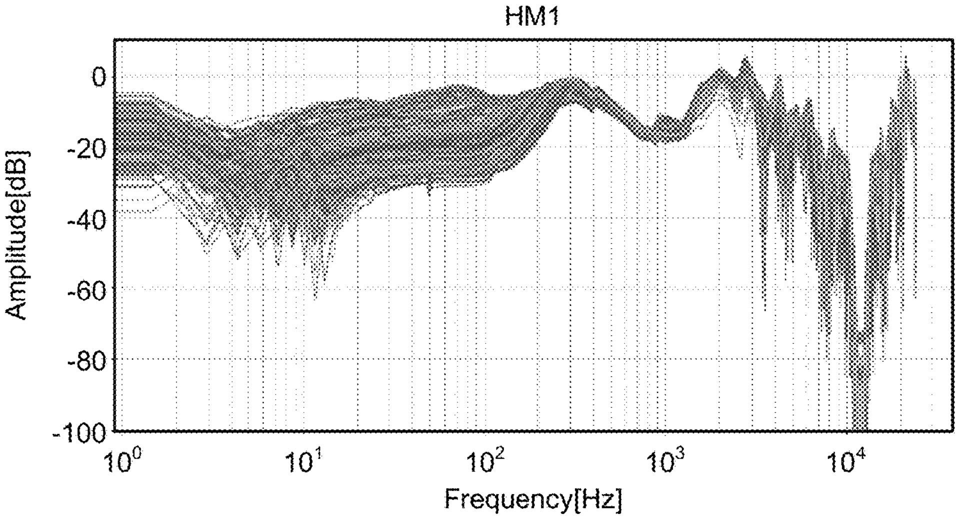
FIGS. 6A and 6B are tables illustrating examples of HM characteristics according to an embodiment.
Figure 6B:
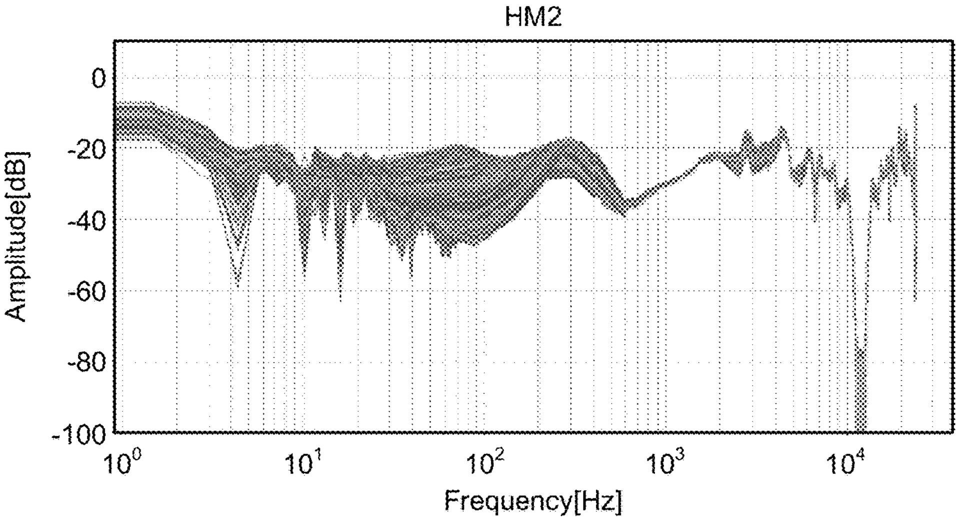

Next, HM characteristics included in the above formula (1) will be described with reference to FIGS. 6A and 6B. FIG. 6A indicates an H1M characteristic that is measured by the microphone arranged at the eardrum position. FIG. 6B indicates an H2M characteristic that is measured by the FBNC microphone. Each of FIGS. 6A and 6B include HM characteristic data that are measured approximately 440 times while changing the wearing condition. Note that all the data illustrated in FIGS. 6A and 6B are data measured using a dummy head, and therefore, there is no difference cause by head shape. Furthermore, the horizontal axis represents frequency (Hz), and the vertical axis represents sound pressure (dB).

Here, as described above, it is difficult to measure H1M characteristic data illustrated in FIG. 6A in the use environment of the user. If the H1M characteristic can be measured, an optimal correction filter coefficient α can be determined by calculation instead of estimation. In addition, the correction filter coefficient α is determined on the basis of the H1M characteristic, and is a value that cannot be determined on the basis of the H2M characteristic. Therefore, as described above, focusing on the device characteristic H2 user, the α default is corrected so as to cancel the difference based on the device characteristic H2 user. However, as illustrated in FIGS. 6A and 6B, the HM characteristic can be greatly different between the H1M characteristic and the H2M characteristic at approximately 200 Hz or more. Examples of factors making the HM characteristic greatly different include the shape of a user's ear canal, ear hair, the temperature and humidity in a room, and the like, but there may be various factors in addition to these factors. Therefore, it has been desired to perform correction in a narrowed band (e.g., approximately 100 Hz) in which the H1M characteristic and the H2M characteristic have tendencies closer to each other. Specifically, in the band in which the tendencies are closer to each other, substitution of the H2M characteristic can provide appropriate correction. However, the similarity cannot be ensured depending on individual differences in head shape between users or wearing condition, and thus, the appropriate correction cannot be appropriately provided in some cases.

Figure 7A:
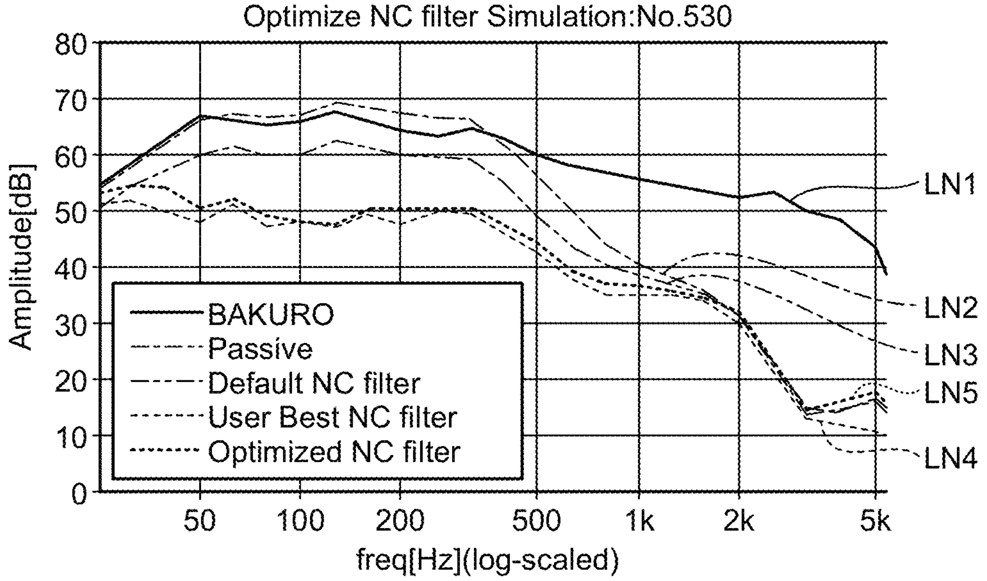
FIG. 7A is a graph illustrating an example of results of simulation of NC effect according to an embodiment.

Next, simulation of the NC effect will be described with reference to FIGS. 7A and 7B. FIG. 7A illustrates an example of results of the simulation measured by the microphone disposed at the eardrum position. FIG. 7A includes five graphs. Among them, a graph LA1 indicates a result of simulation in an exposure state in which the user does not wear headphones and the like. A graph LA2 indicates a result of simulation in a case where the user wears the headphones and the like but does not perform NC. A graph LA3 indicates a result of simulation in a case where NC is performed using the α default. A graph LA4 indicates a result of simulation in a case where NC is performed using an optimal NC filter that maximizes the amount of NC effect. A graph LA5 indicates a result of simulation in a case where NC is performed using an NC filter (corrected filter) that is corrected using a correction filter estimated by machine learning. Note that indexes on the vertical axis and the horizontal axis are similar to those in FIGS. 6A and 6B.

Here, in FIG. 7A, the lower the sound pressure on the vertical axis, the higher the NC effect. Note that the NC effect here includes an effect obtained by sound insulation. In addition, when the graph LA3 and the graph LA4 are compared with each other, it can be seen that the graph LA3 and the graph LA4 have a difference of approximately 15 dB in a band where the graph LA3 and the graph LA4 have a large difference from each other. The graphs LA3 to LA5 indicate that application of the correction filter to the α default provided in the product can approximate to the optimal NC filter. As the graph LA5 approaches the graph LA4, the NC filter corrected by the correction filter estimated by the machine learning has a characteristic closer to the optimal NC filter, indicating improved NC effect. In addition, FIG. 7B illustrates frequency characteristics (gains) of the NC filters corresponding to the graphs LA3 to LA5 of FIG. 7A.

Figure 7B:
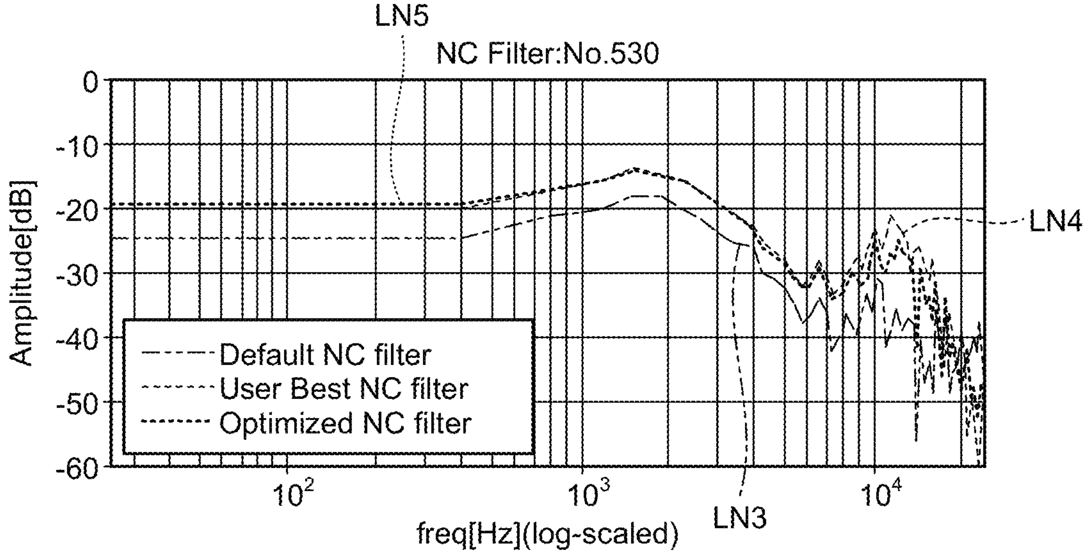
FIG. 7B is a graph illustrating an example of results of the simulation of NC effect according to the embodiment.
Figure 8A:
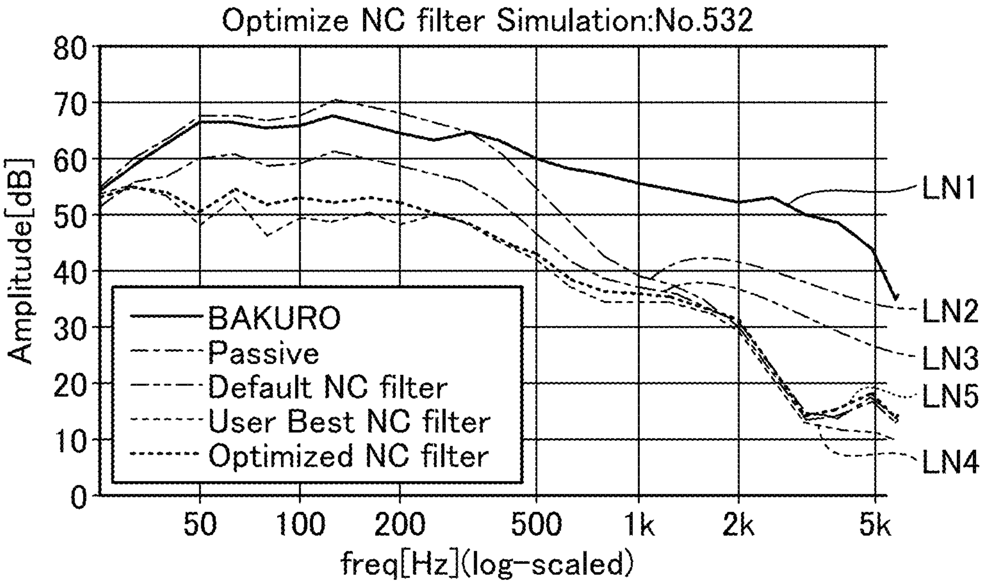
FIG. 8A is a graph illustrating an example of results of simulation of NC effect according to an embodiment.
Figure 8B:
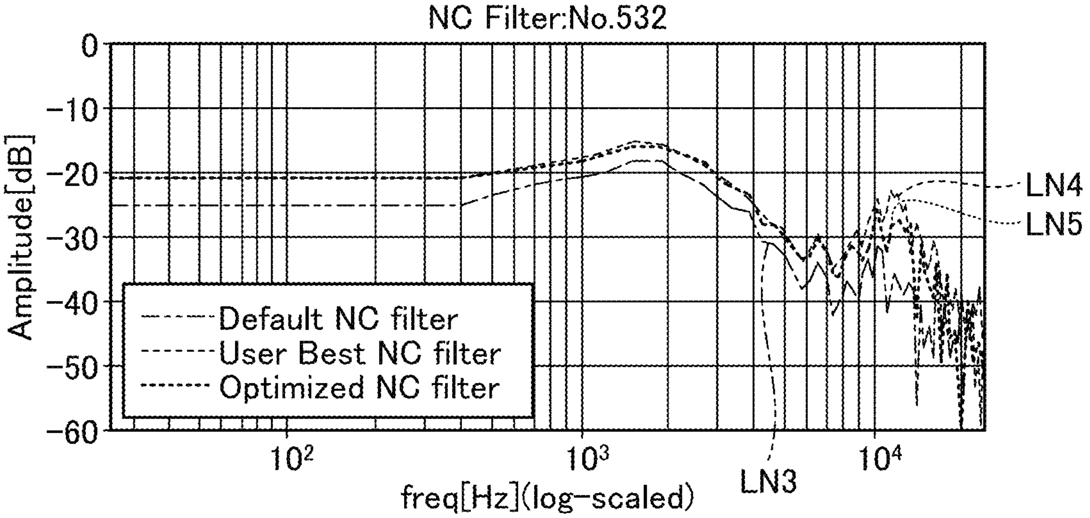
FIG. 8B is a graph illustrating an example of results of the simulation of NC effect according to the embodiment.

FIGS. 8A and 8B illustrate an example of results of simulation upon change in the wearing condition caused by wearing/removing of the headphones and the like by the user who is the target in FIGS. 7A and 7B. Note that the graphs included in FIGS. 8A and 8B are similar to those in FIGS. 7A and 7B, and the description thereof is omitted. Comparison of FIGS. 7A, 7B, 8A, and 8B show that an error in the wearing condition greatly affects the NC effect and the characteristics of the NC filter. For example, at 200 Hz or less, a difference between the graph LA4 and the graph LA5 is significantly larger in FIGS. 8A and 8B than in FIGS. 7A and 7B. For example, the graph LA3 rapidly decreases from around 350 Hz in FIGS. 7A and 7B, whereas the graph LA3 gradually decreases from around 200 Hz in FIGS. 8A and 8B.

Hereinafter, in the embodiment, estimation of the correction filter using the machine learning such as deep neural network (DNN) will be described. Use of the machine learning such as DNN makes it possible to appropriately estimate the correction filter according to the shape of the user's head, the wearing condition, an external ambient sound, and the like without band limitation. This configuration makes it possible for a signal processing apparatus 10 to achieve the NC optimization with a higher degree of freedom in a wider band. Note that the DNN appearing in the embodiment is an example of artificial intelligence.

Hereinafter, in the embodiment, a description will be given of DNN (hereinafter, appropriately referred to as "correction filter coefficient estimation DNN" or "first DNN") that inputs the H2M characteristic measured by the FBNC microphone and outputs a coefficient of the correction filter (correction filter coefficient) for optimally correcting a noise-cancelling signal generated on the basis of measurement data measured by the FFNC microphone. Note that the first DNN is not limited to outputting the correction filter coefficient for correcting the noise-cancelling signal, but may output a correction filter coefficient for optimally correcting a filter that generates the noise-cancelling signal on the basis of the measurement data measured by the FFNC microphone. Furthermore, a description will be given below of DNN (hereinafter, appropriately referred to as "correction determination DNN" or "second DNN") that determines necessity/unnecessity of the correction in a case where insufficient amount of NC effect is provided upon optimization or in a case where insufficient amount of NC effect is provided upon correction due to large leak-in.

Hereinafter, the correction filter according to the embodiment may have, for example, a finite impulse response (FIR) where an impulse response is finite.

Hereinafter, the corrected filter according to the embodiment may be, for example, the α default to which the correction filter at a target time point such as the point of use is applied.

Hereinafter, in the embodiment, estimation of the amount of NC effect in an environment set according to a JEITA standard will be described, but the amount of NC effect not only in addition to the environment set according to JEITA but also in an environment set by another standard may be estimated. The signal processing apparatus 10 is configured to estimate the effect of optimization by estimating the amount of NC effect, and therefore, it is possible to determine whether to perform the optimization.

Hereinafter, in the embodiment, a headphones 20 will be described as an example of the sound output device.

<1.3. Configuration of Signal Processing System>

Figure 9:
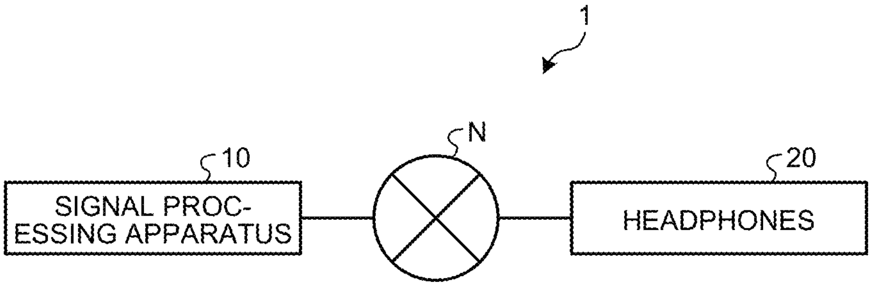
FIG. 9 is a diagram illustrating a configuration example of a signal processing system according to an embodiment.

A configuration of a signal processing system 1 according to the embodiment will be described. FIG. 9 is a diagram illustrating a configuration example of the signal processing system 1. As illustrated in FIG. 9, the signal processing system 1 includes the signal processing apparatus 10 and the headphones 20. Various devices can be connected to the signal processing apparatus 10. For example, the headphones 20 are connected to the signal processing apparatus 10, and information is shared between the signal processing apparatus 10 and the headphones 20. The signal processing apparatus 10 and the headphones 20 are connected to an information communication network by wireless or wired communication so as to mutually perform information/data communication and operate in cooperation. The information communication network may include the Internet, a home network, an Internet of Things (IoT) network, a Peer-to-Peer (P2P) network, a mesh network for proximity communication, and the like. The wireless communication can use, for example, Wi-Fi, Bluetooth (registered trademark), or a technology based on a mobile communication standard such as 4G or 5G. For the wired communication, a power line communication technology such as Ethernet (registered trademark) or power line communications (PLC) can be used.

The signal processing apparatus 10 and the headphones 20 may be separately provided as a plurality of computer hardware devices on so-called on-premises, edge server, or cloud, or the functions of a plurality of any devices of the signal processing apparatus 10 and the headphones 20 may be provided as the same device. For example, the signal processing apparatus 10 and the headphones 20 may be devices configured so that the signal processing apparatus 10 and the headphones 20 function integrally and communicate with an external information processing device. Furthermore, the signal processing apparatus 10 and the headphones 20 are configured so that the user may perform mutual information/data communication with the signal processing apparatus 10 and the headphones 20 via a user interface (including a graphical user interface: GUI) and software (including a computer program (hereinafter, also referred to as a program)) that operate on a terminal device (personal device, such as a personal computer (PC) or a smartphone, including a display as an information display device and a voice and keyboard input) which is not illustrated.

(1) Signal Processing Apparatus 10

The signal processing apparatus 10 is an information processing apparatus that performs processing of determining the coefficient of the correction filter (filter coefficient) for performing optimal NC for an individual user. Specifically, the signal processing apparatus 10 acquires an acoustic characteristic in a user's ear, isolated from the outside world. Then, the signal processing apparatus 10 generates sound data having a phase opposite to the ambient sound leaking into the user's ear, and corrects the sound data by using the correction filter. Furthermore, the signal processing apparatus 10 determines the correction filter coefficient on the basis of the acoustic characteristic. This configuration makes it possible for the signal processing apparatus 10 to estimate the correction filter coefficient for optimization without requiring a signal at the eardrum position. Furthermore, the signal processing apparatus 10 can achieve processing for optimization without relying on the experience or knack of a designer. For this reason, the signal processing apparatus 10 has room for promoting further improvement in usability.

Furthermore, the signal processing apparatus 10 also has a function of controlling the overall operation of the signal processing system 1. For example, the signal processing apparatus 10 controls the overall operation of the signal processing system 1 on the basis of information shared between the apparatus and device. Specifically, the signal processing apparatus 10 determines the correction filter coefficient for optimization on the basis of information received from the headphones 20.

The signal processing apparatus 10 is implemented by a personal computer (PC), a server (Server), or the like. Note that the signal processing apparatus 10 is not limited to the PC, server, or the like. For example, the signal processing apparatus 10 may be a computer hardware device such as a PC or a server in which functions as the signal processing apparatus 10 are implemented as an application.

(2) Headphones 20

The headphones 20 are used by the user to listen to sound. The headphones 20 may be, not limited to the headphones, any sound output device, as long as the sound output device has a driver and a microphone and isolates a space including a user's eardrum from the outside world. For example, the headphones 20 may be earphones.

For example, the headphones 20 collect measurement sound output from the driver with the microphones.

2. Function of Signal Processing System

The configuration of the signal processing system 1 has been described above. Next, the functions of the signal processing system 1 will be described. Note that the functions of the signal processing system 1 include a function of estimating the correction filter coefficient for correcting the α default to perform optimal NC for an individual user, and a function of determining whether to perform the optimal NC for the individual user.

Figure 10:
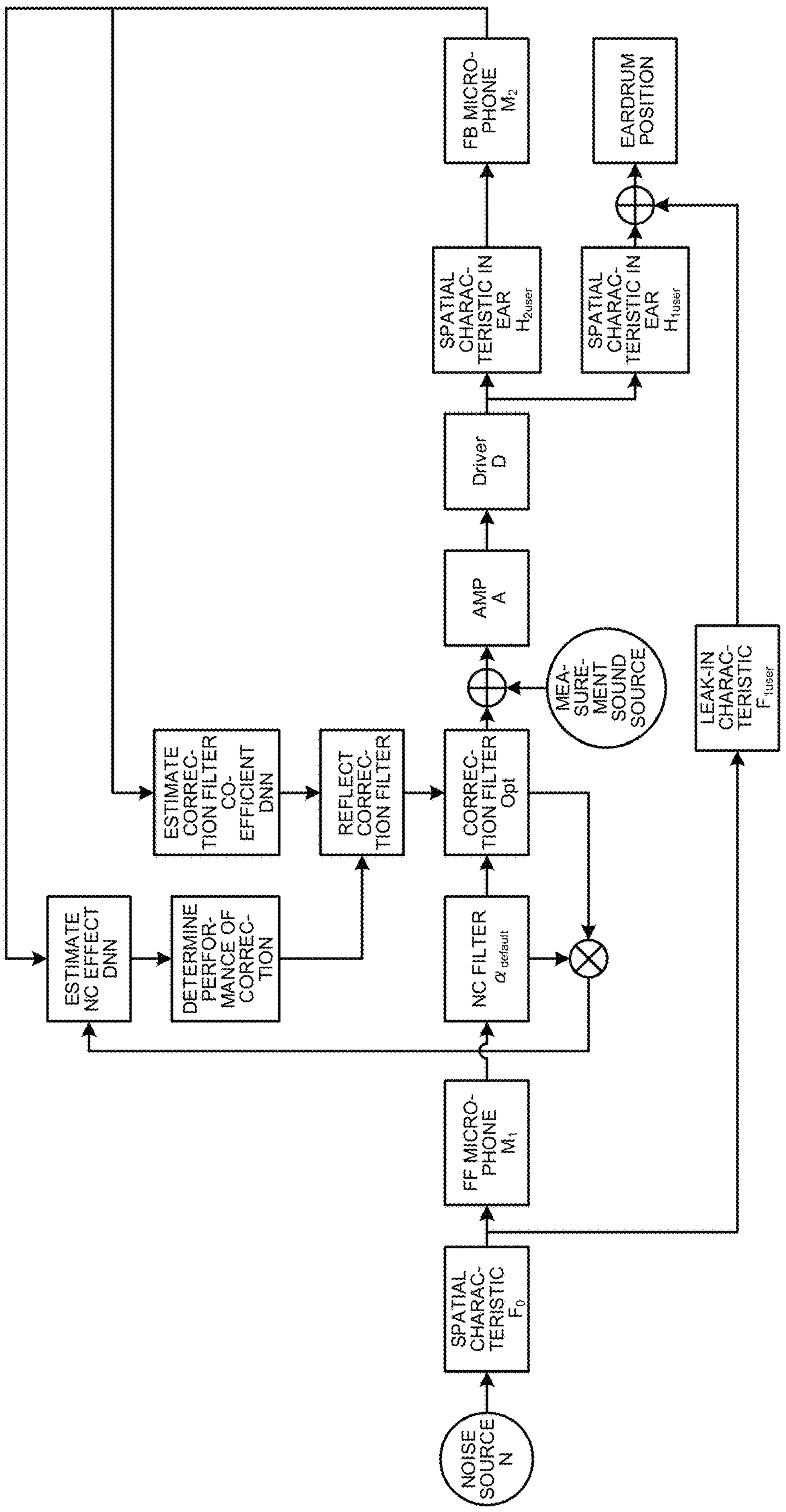
FIG. 10 is a diagram illustrating an overview of a function for NC optimization according to an embodiment.

FIG. 10 is a diagram illustrating an overview of a function for performing the optimal NC for the individual user. The signal processing system 1 measures the acoustic characteristic (H2 user M2 characteristic) on the basis of a signal collected by the second microphone. Then, the signal processing system 1 estimates the correction filter coefficient by using the first DNN that estimates the correction filter coefficient on the basis of the measured acoustic characteristic. In addition, the signal processing system 1 estimates the NC effect of the α default on the basis of the measured H2 user M2 characteristic, and uses the second DNN to determine whether a sufficient correction effect is expected, and applies the correction filter when the sufficient correction effect is expected. The first DNN and the second DNN will be described below.

<2.1. First DNN>

In the first DNN, the H2 user M2 characteristic based on the signal collected by the second microphone is input, and the correction filter coefficient is output. In the first DNN, optimization using Adam is performed as an example of an optimization method. In the first DNN, the correction filter coefficient based on H1 user M3 is used as training data. Here, in the first DNN, for example, a gradient method may be used to obtain the correction filter coefficient where a result of the simulation of NC satisfies the minimum, and the correction filter coefficient may be used as the training data. In the first DNN, the training data is used in which this correction filter coefficient is output and the H2 user M2 characteristic is input. The first DNN may use a loss function to transform both of the training data and estimation data into the frequency characteristic by Fast Fourier transform (FFT) and then use a common low-pass filter to calculate an average (average value) from a sum of absolute values of differences in the respective bands.

<2.2. Second DNN>

In the second DNN, the acoustic characteristic (e.g., a time signal of the impulse response and a frequency signal obtained by FFT) based on the signal collected by the second microphone and a corrected filter coefficient are input, and whether to perform correction is output. In the second DNN, optimization using the Adam is performed as an example of an optimization method. In the second DNN, a loss function based on cross entropy is used. In the second DNN, the simulation of NC is performed using the H2 user M2 characteristic, the microphone characteristic M1, the microphone characteristic M3, and the corrected filter coefficient. Then, the second DNN uses, as the training data, data labeled to indicate whether to perform correction, on the basis of whether the amount of NC effect that is the correction effect obtained as the result of simulation is equal to or more than a predetermined threshold. Here, the amount of NC effect represents a suppression amount that is obtained when the sound pressure at the eardrum position is compared between the exposure state in which the headphones 20 are not worn and an NC effective state, using a predetermined noise sound source and noise environment. For example, the signal processing system 1 may perform ⅓ octave band analysis for each of the exposed state in which the headphones 20 are not worn and the NC effective state, performing processing with the suppression amount and a noise suppression ratio in each band as the amount of NC effect.

Figure 11:
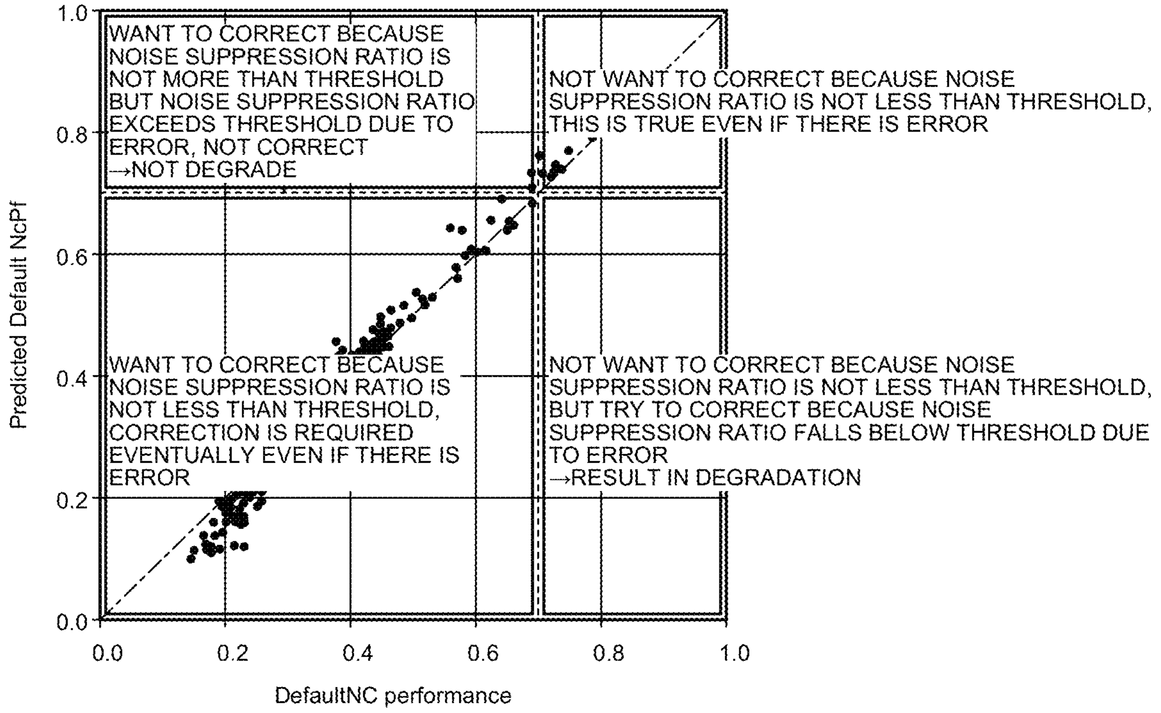
FIG. 11 is a graph illustrating an example of results of estimation by second DNN according to an embodiment.

FIG. 11 indicates results of estimation by the second DNN with the noise suppression ratio as the amount of NC effect. Specifically, illustrated is the results of the estimation of the noise suppression ratio of the correction filter coefficient α, using an H2M2 characteristic as an input. Here, in a case where correction is not performed when the noise suppression ratio is equal to or larger than a predetermined threshold, the results can be divided into four quadrants as illustrated in FIG. 11. In FIG. 11, the predetermined threshold is 0.7. Here, the horizontal axis represents correct data, and the vertical axis represents estimation data. Note that the signal processing system 1 learns the second DNN according to input of the corrected filter coefficient.

Next, optimization based on the noise suppression ratio will be described. Here, the functions of the signal processing system 1 include a function of estimating whether noise is suppressed by correcting the NC filter. The signal processing system 1 uses DNN (hereinafter, appropriately referred to as “noise suppression ratio estimation DNN” or “third DNN”) that outputs the noise suppression ratio, thereby estimating whether noise is suppressed. The third DNN will be described below.

<2.3. Third DNN>

In the third DNN, the H2 user M2 characteristic, the H2M2 characteristic, and the $\alpha$ default are input, and the noise suppression ratio is output. In the third DNN, optimization using the Adam is performed as an example of an optimization method. In the third DNN, a loss function based on a mean square error is used.

<2.4. Correction Filter Estimation Process>

Figure 12:
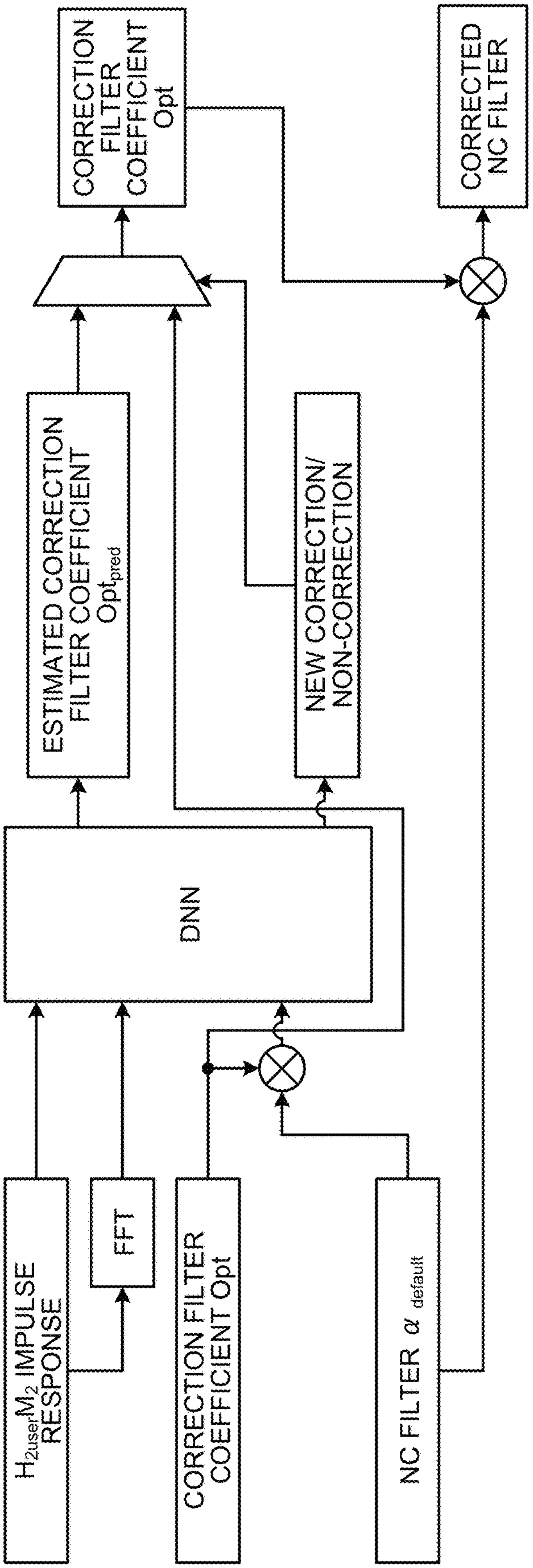
FIG. 12 is a diagram illustrating an overview of functions of the signal processing system according to an embodiment.

FIG. 12 is a diagram illustrating an overview of functions of the signal processing system according to the embodiment. FIG. 12 illustrates the first DNN and the second DNN that function integrally. In FIG. 12, the integrated first DNN and second DNN are collectively referred to as “DNN”. In the DNN illustrated in FIG. 12, the H2 user M2 characteristic and the corrected filter are input, and the correction filter coefficient and whether to perform the correction are output. Furthermore, in the DNN illustrated in FIG. 12, the corrected filter may be provided as a final output. Note that, in FIG. 12, two DNNs of the first DNN and the second DNN are configured to be connected with a fully connected layer so as to be integrated with each other has been illustrated. However, the first DNN and the second DNN may be configured to be separately arranged.

Next, described is estimation of a correction filter that corrects a difference based on the acoustic characteristic of an ambient sound measured. Here, the correction filter that corrects an error in the wearing condition of the user, as described above, is appropriately referred to as “wearing error correction filter” or “first correction filter”. Furthermore, the correction filter that corrects the difference based on the acoustic characteristic of the ambient sound is appropriately referred to as “ambient sound difference correction filter” or “second correction filter”. Here, in a case where the first correction filter is estimated, there is a possibility that the noise drowns the measurement sound unless the environment is quiet to some extent. In a case where the second correction filter is estimated, in some cases, a somewhat loud noise may be desirable to facilitate measurement of the characteristics of the ambient sound. Therefore, the signal processing system 1 determines whether which one of the first correction filter and the second correction filter is to be estimated according to a noise level of the ambient sound.

Figure 13:
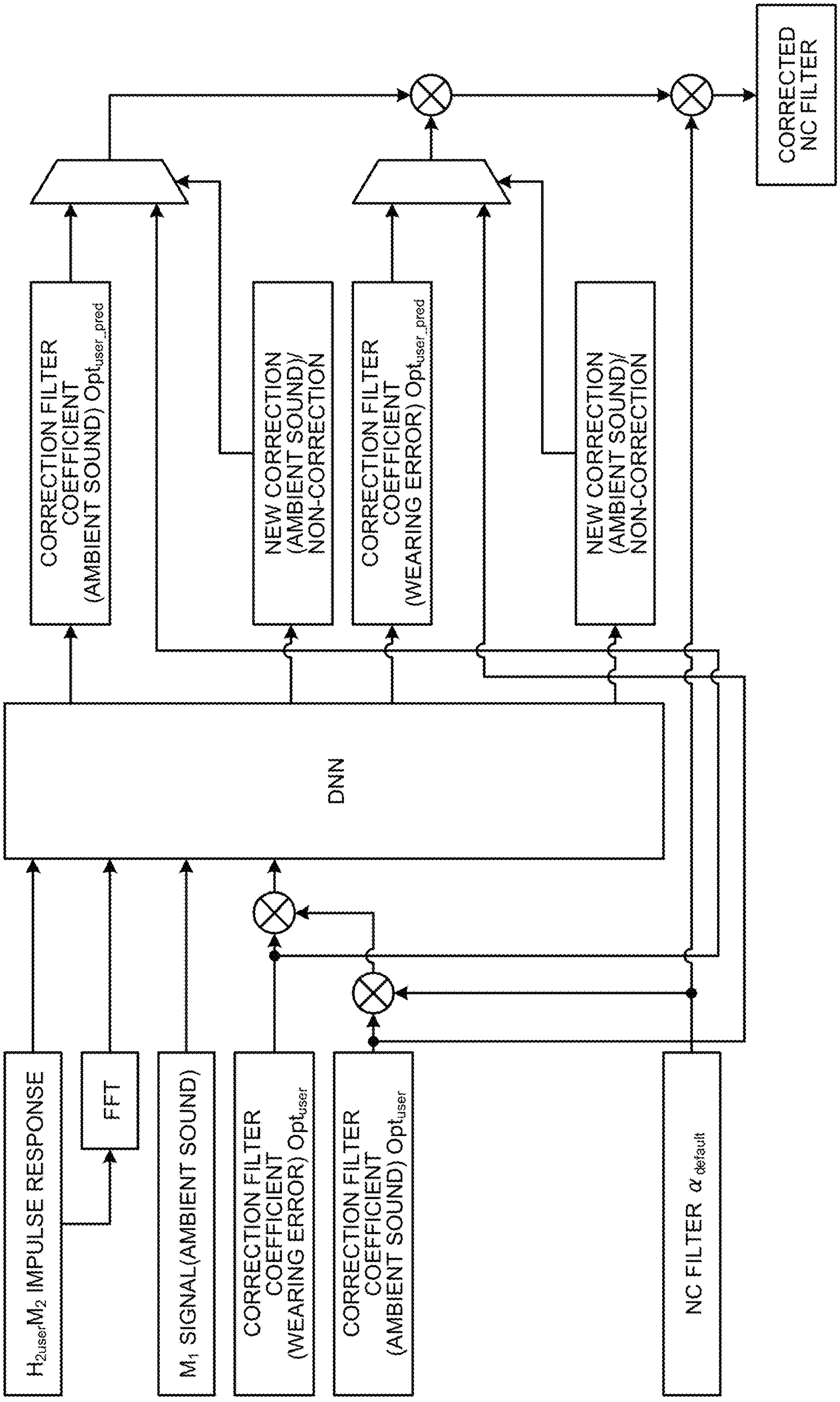
FIG. 13 is a diagram illustrating an overview of functions of the signal processing system according to an embodiment.

FIG. 13 is a diagram illustrating an overview of a process using the first correction filter and the second correction filter, in addition to the process of FIG. 12. Note that when the first correction filter is estimated, processing is performed on the basis of input/output information and the like similar to those in FIG. 12. Here, the functions of the signal processing system 1 include a function of estimating the correction filter coefficient on the basis of the ambient sound. The signal processing system 1 uses DNN (hereinafter, appropriately referred to as “ambient sound difference correction filter coefficient estimation DNN” or “fourth DNN”) that outputs a second correction filter coefficient, thereby estimating the corrected filter. Processing of estimating the second correction filter by the fourth DNN will be described below.

<2.5. Fourth DNN>

In the fourth DNN, a signal collected by the first microphone and the corrected filter at the target time point are input, and the second correction filter coefficient is output. In the fourth DNN, optimization using the Adam is performed as an example of an optimization method. In the fourth DNN, H1M3 and an acoustic characteristic F1 user are used to measure a surrounding sound field on the basis of various ambient sounds. In this configuration, the signal processing system 1 estimates an optimal filter coefficient based on the signal collected by the first microphone and a signal collected by the third microphone. Then, the signal processing system 1 uses, for example, a gradient method to estimate a correction filter coefficient for correcting a difference between the $\alpha$ default and the optimal filter coefficient. Then, the signal processing system 1 generates the training data in which the signal collected by the first microphone is input and the estimated correction filter coefficient is output. In the fourth DNN, after both the training data and the estimation data are weighted for each frequency band by using the loss function, an average may be calculated from a sum of an amplitude and a phase distance of each band. Here, the weighting for each frequency band is, for example, weighting based on exclusion of a high frequency band from which the NC effect using a low pass filter cannot be expected or exclusion of a low frequency band that has low frequency resolution using a high pass filter.

<2.6. Procedure of Process>

Figure 14:
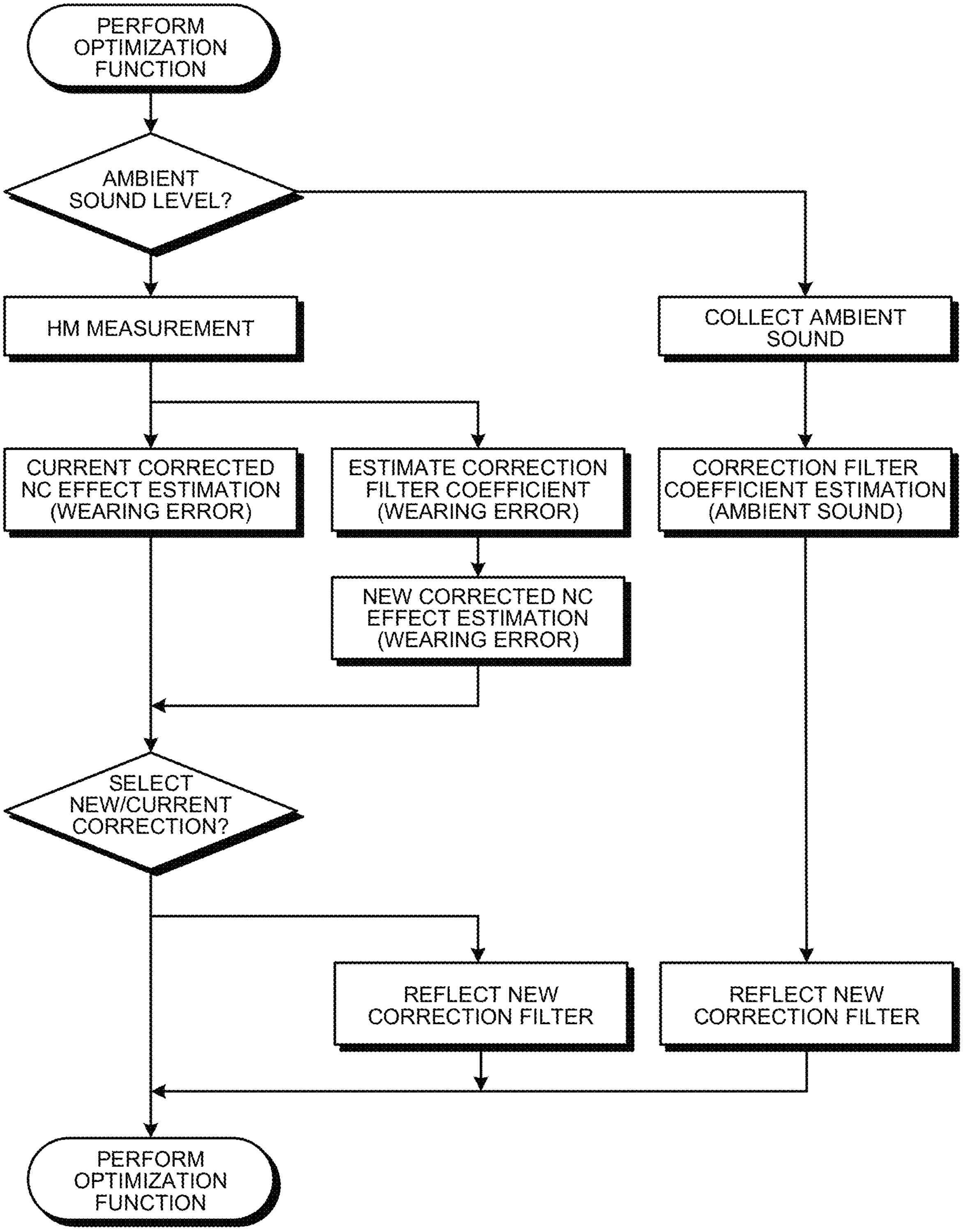
FIG. 14 is a flowchart illustrating a procedure of a process in the signal processing system according to an embodiment.

FIG. 14 is a flowchart illustrating a procedure of the process according to FIG. 13. The signal processing system 1 determines whether to perform correction based on the first correction filter or correction based on the second correction filter, depending on the loudness of the ambient sound upon performing the function of the optimization. Note that a procedure of processing related to the signal processing apparatus 10 will be described later in detail.

Figure 15:
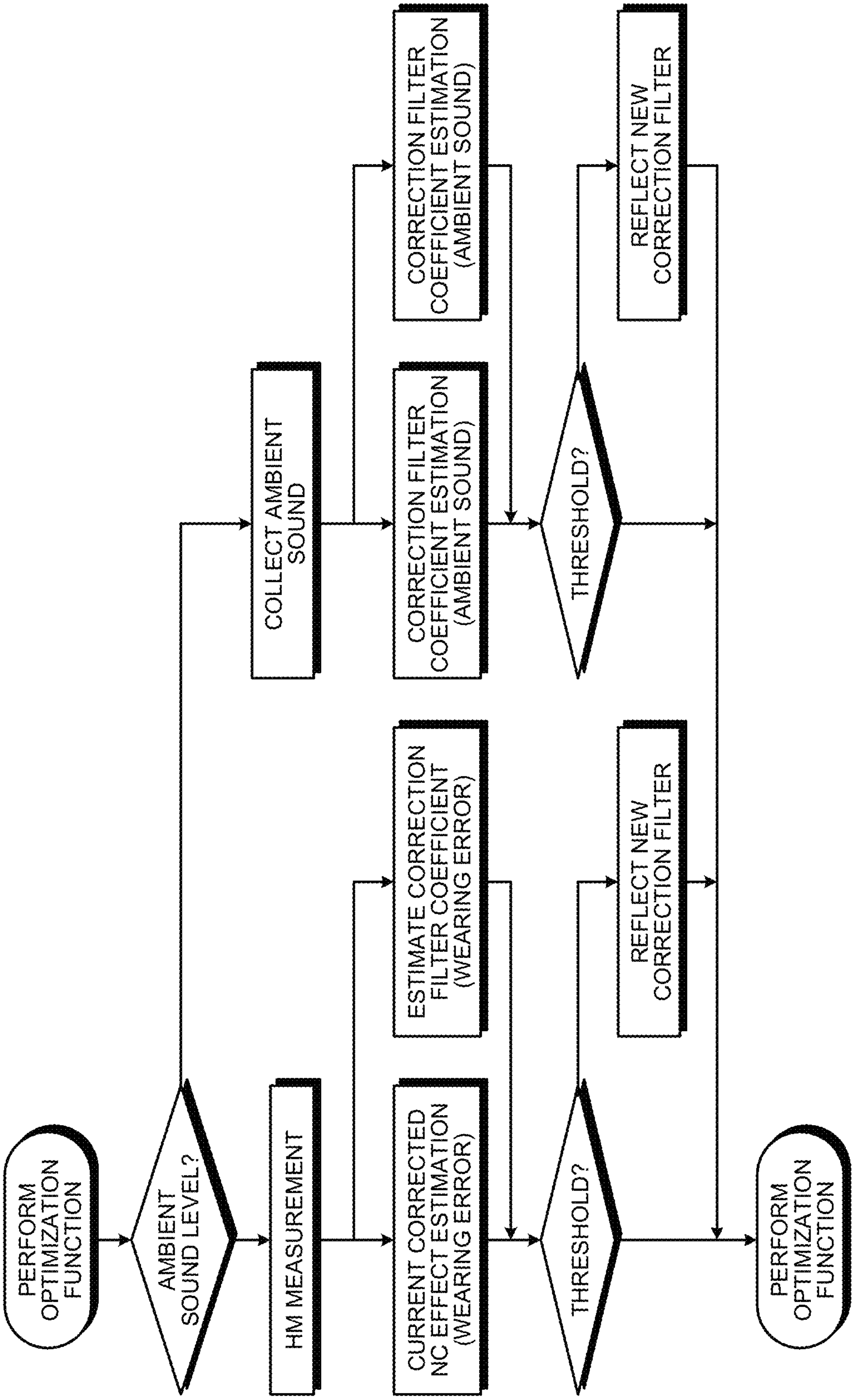
FIG. 15 is a flowchart illustrating a procedure of a process in the signal processing system according to an embodiment.

FIG. 15 is a flowchart illustrating a procedure of a process of determining whether to perform the correction based on the second correction filter after the determination based on the ambient sound, in addition to the process of FIG. 14. The signal processing system 1 determines whether to perform the correction based on the second correction filter, according to the estimated magnitude of the second correction filter coefficient.

Figure 16:
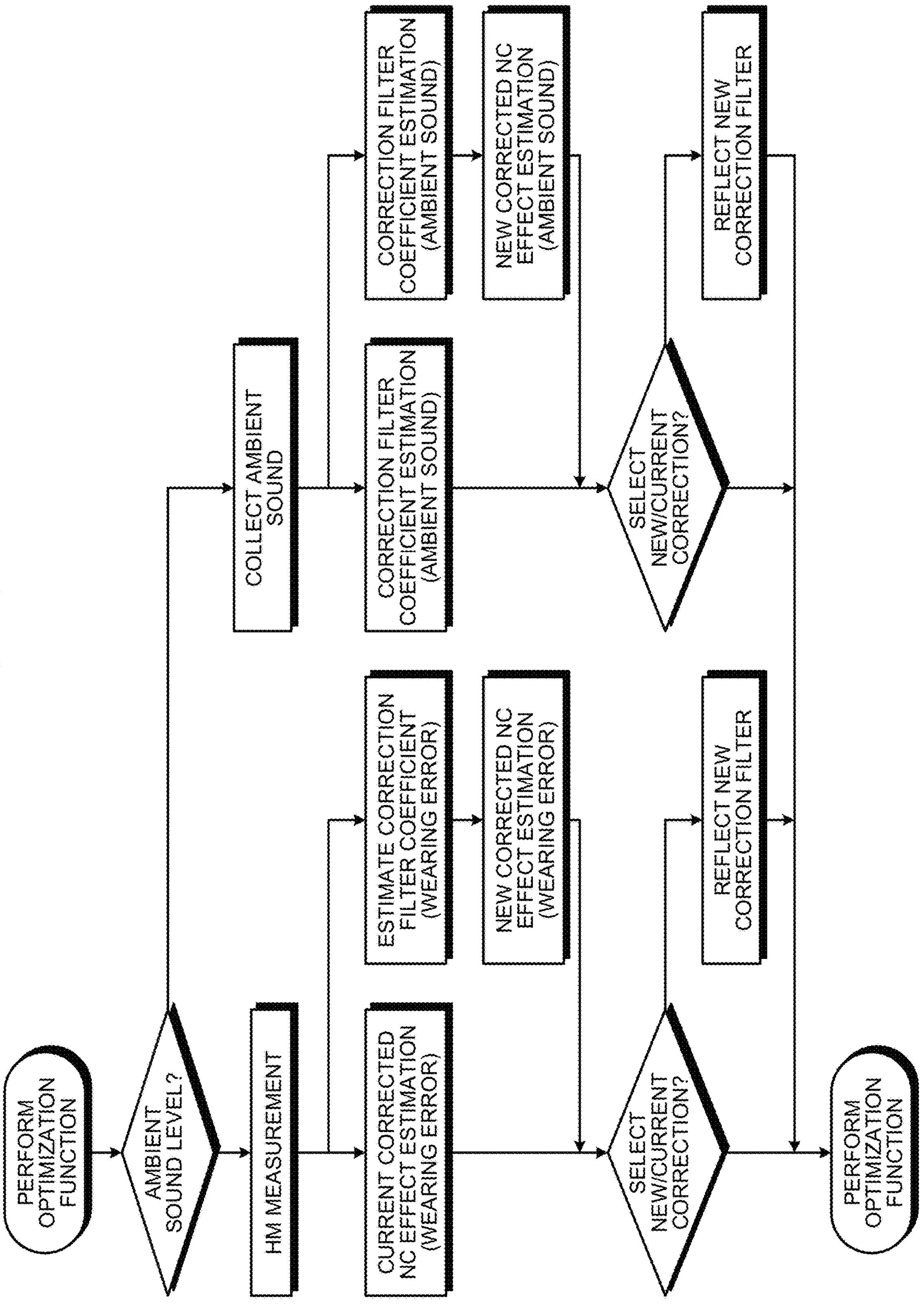
FIG. 16 is a flowchart illustrating a procedure of a process in the signal processing system according to an embodiment.

FIG. 16 is a modification of FIG. 15. FIG. 16 is a flowchart illustrating a procedure of a process of comparing a current corrected NC effect estimation result with a new corrected NC-effect estimation result to determine whether to perform correction. In FIG. 16, it is not necessary to determine whether to perform correction on the basis of comparison with the thresholds as illustrated in FIGS. 14 and 15.

<2.7. Storage of and Reference to Correction Filter>

Figure 17:
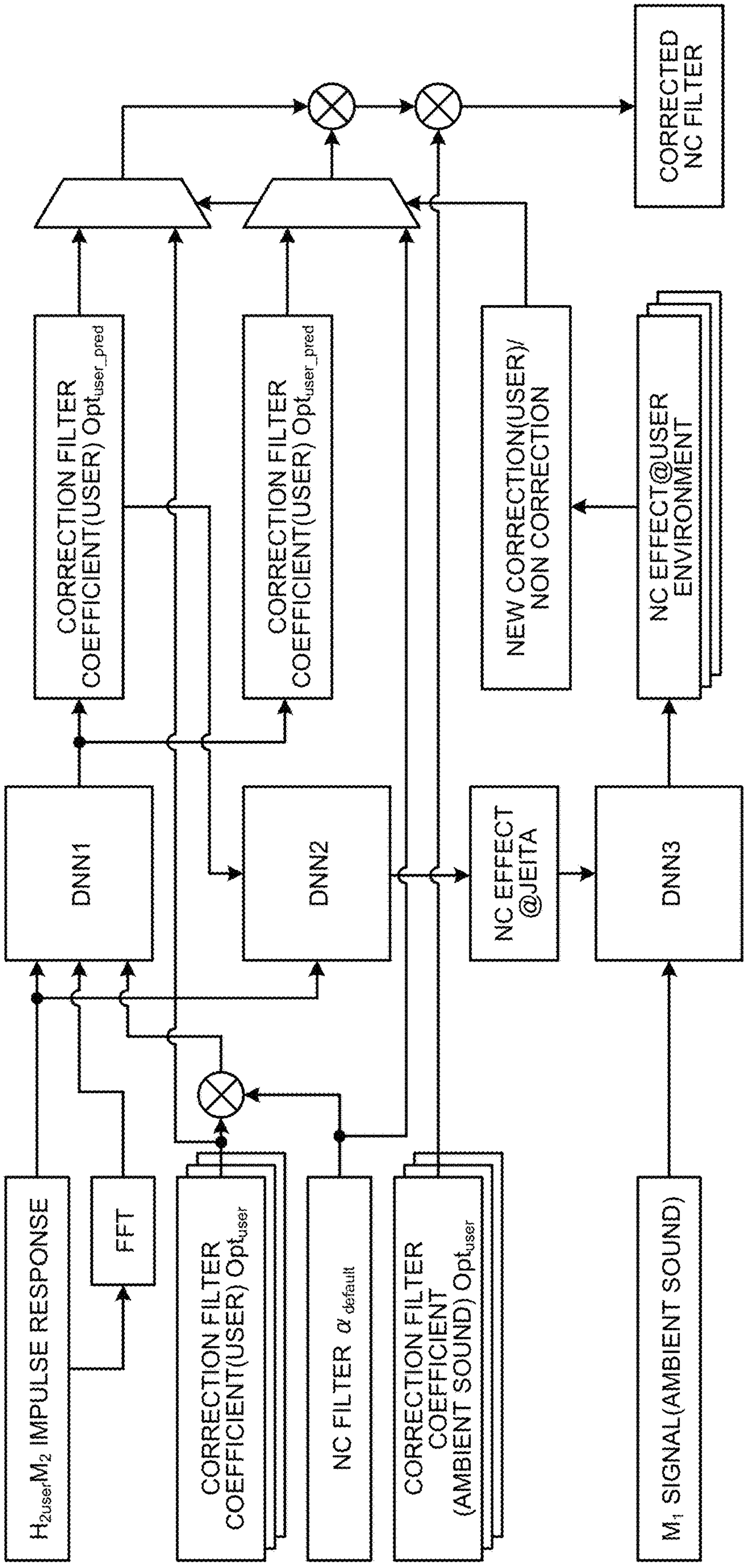
FIG. 17 is a diagram illustrating an overview of a function of storing and referring to a correction filter according to an embodiment.

FIG. 17 illustrates an overview of functions of the signal processing system 1 to memory (store) the correction filter coefficient and perform processing on the basis of a history of the correction filter coefficient to perform the function of the optimization. In recent years, products having a plurality of a defaults, which are preset NC filters, have also become widespread. FIG. 17 illustrates performing the processing of optimization on the basis of one a default, but the processing may be performed on the basis of the plurality of a defaults. Here, DNN1 of FIG. 17 is the first DNN. In FIG. 17, DNN2 is DNN (hereinafter, appropriately referred to as “NC effect estimation DNN” or “fifth DNN”) that estimates the NC effect obtained when an NC filter having a predetermined filter coefficient is used. In FIG. 17, DNN3 is DNN (hereinafter, appropriately referred to as “NC-effect user environment estimation DNN” or “sixth DNN”) that estimates the NC effect in an environment set according to a predetermined standard. Note that the fifth DNN and the sixth DNN will be described later in detail. Furthermore, the NC effect JEITA in FIG. 17 is an amount of NC effect in a noise environment according to the JEITA standard. Note that in some cases, the noise suppression ratio may be used as the amount of NC effect in the noise environment according to the JEITA standard, but use of the noise suppression ratio provides output of one numerical value, which is insufficient to be input to the DNN 3. Therefore, here, the noise suppression ratio is not used as the amount of NC effect.

Next, procedures of processes of storing and referring to the correction filter will be described with reference to FIGS. 18A, 18B, 18C, 19, 20, 21A, 21B, 21C, 22A, 22B, 22C, 23A, 23B, 23C, 23D, and 24. In FIGS. 18A, 18B, 18C, 19, 20, 21A, 21B, 21C, 22A, 22B, 22C, 23A, 23B, 23C, 23D, and 24, description will be given using an example of a memory (e.g., a storage unit 120) stored by the signal processing apparatus 10. In FIGS. 18A, 18B, 18C, 19, 20, 21A, 21B, 21C, 22A, 22B, 22C, 23A, 23B, 23C, 23D, and 24, one numerical value is calculated as an index by performing predetermined processing such as weighting and averaging on the basis of the amount of NC effect in each band. Note that the predetermined processing may be, not limited to the processing of weighting and averaging on the basis of the amount of NC effect in each band, any processing as long as the processing calculates a numerical value as the index of the amount of NC effect. This calculation provides a numerical value between 0 and 1. Furthermore, in the description, the larger the numerical value, the higher the NC performance. First, processing for updating the first correction filter stored in the memory will be described. FIGS. 18A, 18B, and 18C illustrate a case where the processing of optimization is not performed.

FIG. 18A illustrates a state in which nothing is stored in the memory for the correction filter. For example, FIG. 18A illustrates an initial state upon purchasing the headphones 20 or the like. Hereinafter, a state in which the first correction filter is used is referred to as "N. Standard" as appropriate. In addition, a state in which the headphones 20 are worn and optimization is not being performed will be hereinafter referred to as "O. Unknown" as appropriate.

FIG. 18B illustrates a state in which the amount of NC effect is stored that is obtained when the user uses the headphones 20 during moving on a train while wearing nothing, such as glasses so as not to affect the wearing condition of the headphones 20. Hereinafter, a state in which the user is moving by train is referred to as "B. Train" as appropriate. Note that since the processing of optimization has not been performed, the wearing condition indicates "O. Unknown". Here, the amount of NC effect of "0.55" is stored in "B. Train" during the state of "O. Unknown". The signal processing apparatus 10 stores an actually measured value of the amount of NC effect in "B. Train" during the state of "O. Unknown". The signal processing apparatus 10 stores ambient sound of "B. Train". Note that although the description has been made using a label "B. Train", for convenience of description, it is assumed that the headphones 20 do not need to recognize the use environment at that time as "B. Train".

FIG. 18C illustrates a state in which the amount of NC effect is stored that is obtained when the user uses the headphones 20 while moving on the bus after "B. Train". Hereinafter, a state in which the user is moving by bus is referred to as "C. Bus" as appropriate. Here, it is assumed that the amount of NC effect in "C. Bus" is larger than the amount of NC effect in "B. Train". Here, the amount of NC effect of "0.60" is stored in "C. Bus" during the state of "O. Unknown". In FIG. 18C, the signal processing apparatus 10 stores an actually measured value of the amount of NC effect in "C. Bus" during the state of "O. Unknown". The signal processing apparatus 10 stores the ambient sound obtained in "C. Bus".

Figure 19:
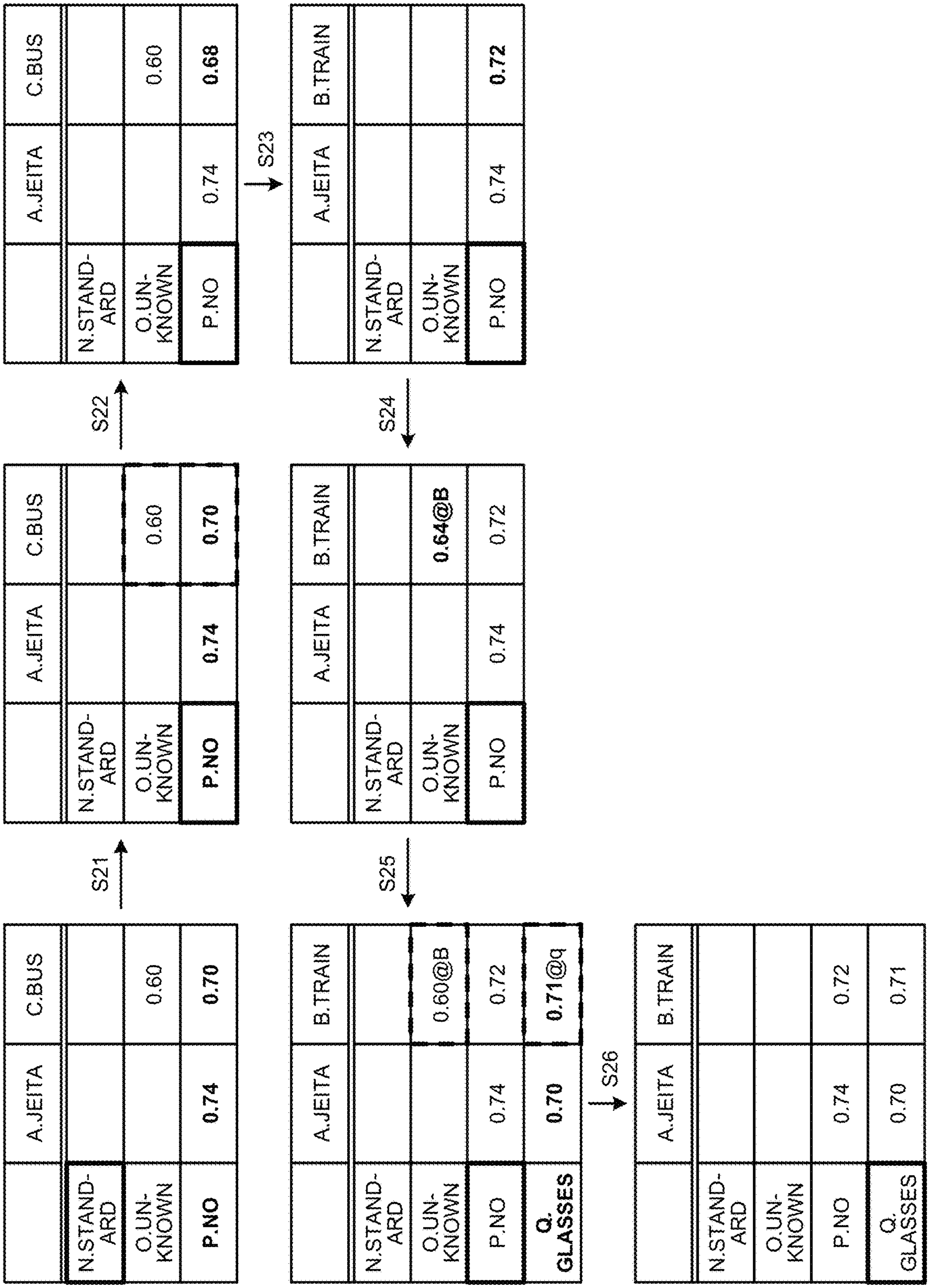
FIG. 19 is graphs illustrating a procedure of a process of storing and referring to the correction filter according to an embodiment.

Subsequently, FIG. 19 illustrates a case where the user notices the function of the optimization and performs the optimization in a quiet environment while wearing the headphones 20. Hereinafter, a state in which the user performs the function of the optimization while wearing no glasses or the like is referred to as "P. No (mounting)" as appropriate. The signal processing apparatus 10 determines that a spatial characteristic in wearing the headphones 20 when the function of the optimization is performed during the state of "P. No" is different from the state of "N. Standard", and estimates a correction filter (p) as the first correction filter. In addition, the signal processing apparatus 10 estimates the amount of NC effect for each of application of the correction filter (p) and non-application of the correction filter (p). Here, as the amount of NC effect upon application of the correction filter (p), the amount of NC effect of "0.70" is stored in "C. Bus" during the state of "P. No". The signal processing apparatus 10 stores an estimated value of the amount of NC effect in "C. Bus" during the state of "P. No". Note that, when the correction filter (p) is not applied, the actually measured value stored in "O. Unknown" is used for the amount of NC effect. In addition, the amount of NC effect of "0.74" is stored in "A. JEITA" during the state of "P. No". The signal processing apparatus 10 stores an estimated value of the amount of NC effect in "A. JEITA" during the state of "P. No".

The signal processing apparatus 10 compares the amount of NC effect between two values of "O. Unknown" and "P. No" in "C. Bus" to update the first correction filter (S21). Here, the signal processing apparatus 10 compares the amount of NC effect of "0.60" in "O. Unknown" with the amount of NC effect of "0.70" in "P. No", and updates the first correction filter to the correction filter (p), because the amount of NC effect of "P. No" is larger. Subsequently, the signal processing apparatus 10 stores the amount of NC effect obtained when the headphones 20, which are kept worn, is used in "C. Bus" by using the updated first correction filter (S22). Here, the amount of NC effect of "0.68" is stored in "C. Bus" during the state of "P. No". Subsequently, the signal processing apparatus 10 measures the amount of NC effect obtained when using the headphones 20, which are kept worn, in "B. Train", and compares the amount of NC effect with the amount of NC effect obtained when the headphones 20 are used in "C. Bus" (S23). The amount of NC effect is larger in "B. Train", and therefore, the signal processing apparatus 10 overwrites the amount of NC effect. A condition of the ambient sound has changed from "C. Bus" to "B. Train" when the amount of NC effect being maximum is stored, and therefore, the signal processing apparatus 10 deletes (erases) the storage of "C. Bus".

Thereafter (e.g., at a later date), the signal processing apparatus 10 stores the amounts of NC effect obtained when the user uses the headphones 20 in "B. Train" and "C. Bus" while wearing the glasses without performing the function of the optimization (S24). Here, the amount of NC effect of "0.64" is stored in "B. Train" during the state of "O. Unknown". Subsequently, it is assumed that the user performs the function of the optimization in a quiet environment while wearing the headphones 20. Hereinafter, a state in which the optimization is performed while the spectacles are worn is referred to as "Q. Glasses" as appropriate. The signal processing apparatus 10 determines that a characteristic in wearing the headphones 20 when the function of the optimization is performed during the state of "Q. Glasses" is different from "N. Standard" and "P. No", and estimates a correction filter (q) as the first correction filter (S25). In addition, the signal processing apparatus 10 estimates the amount of effect of each of "A. JEITA" and "B. Train" during the state of "Q. Glasses". Here, the amount of NC effect of "0.70" is stored in "A. JEITA" and the amount of NC effect of "0.71" is stored in "B. Train", during the state of "Q. Glasses". Here, the actually measured value is stored in "O. Unknown", and therefore, this actually measured value is used for the amount of NC effect of "B. Train" during the state of "Q. Glasses". Note that when no actually measured value is stored in "O. Unknown", the amount of NC effect of "A. JEITA" during the state of "Q. Glasses" is estimated as an input together with the ambient sound of "B. Train". Then, the signal processing apparatus 10 compares the amount of NC effect between two values of "O. Unknown" and "Q. Glasses" in "B. Train" to update the first correction filter (S26). Here, the signal processing apparatus 10 compares the amount of NC effect of "0.64" in "O. Unknown" with the amount of NC effect of "0.71" in "Q. Glasses", and updates the first correction filter to the correction filter (q), because the amount of NC effect of "Q. Glasses" is larger as a result of the comparison.

Figure 20:
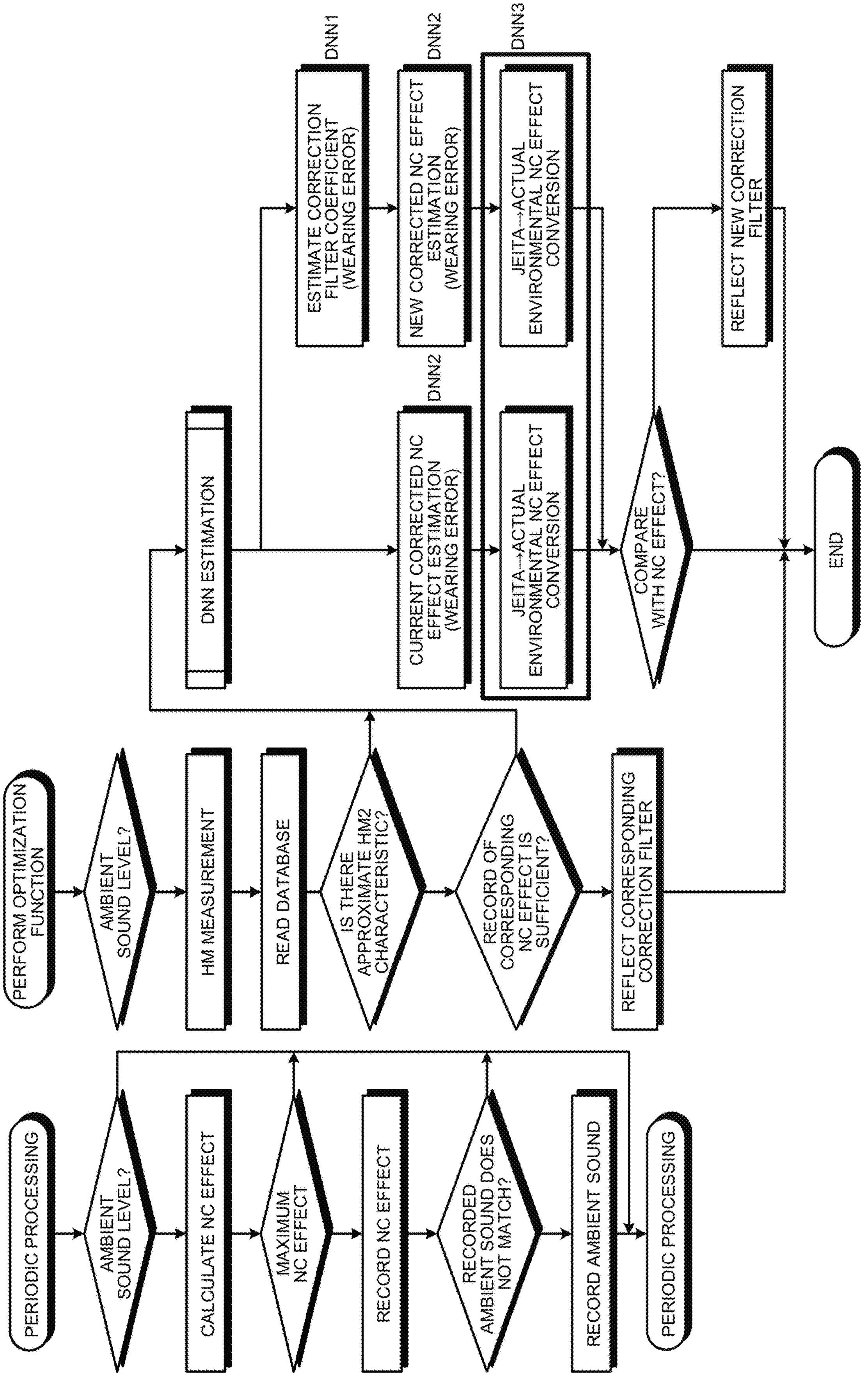
FIG. 20 is a diagram illustrating a procedure of a process of storing and referring to the correction filter according to an embodiment.

FIG. 20 is a flowchart illustrating a procedure of the processes according to FIGS. 18A, 18B, 18C, and 19.

In order to determine the approximation to the H2 user M2 characteristic, the signal processing apparatus 10 may rearrange the correction filters so as to change the order of searching a list in the memory to have the order of the amount of NC effect or the order of the frequency of approximation to the H2 user M2 characteristic, instead of the order of storage or the order of address. Therefore, the signal processing apparatus 10 is allowed to select a correction filter with higher reliability. Here, some users perform the function of the optimization not so frequently. There is possibility that the headphones 20 may be used multiple times before the function of the optimization is performed. For this reason, the signal processing apparatus 10 may store the amount of NC effect during the state of "O. Unknown" and use the amount of NC effect to search for an approximate characteristic. For example, the signal processing apparatus 10 may store (1) "an average value of the amount of NC effect in a target wearing condition", (2) "an average value of the amount of NC effect in the unknown wearing condition", (3) "the frequency of using the headphones 20 when the correction filter is selected in the target wearing condition", and (4) "the frequency of using the headphones 20 when the correction filter is selected during the unknown wearing condition", and the like of each correction filter, and may use the values to search for the approximate characteristic.

There is a high possibility that the frequency of use in (3) described above depends on variation in the wearing condition of the user, and therefore, the signal processing apparatus 10 may perform the processing in descending order of the frequency to search for the approximate characteristic. Here, the correction filter high in the frequency of use in (3) described above tends to have the same wearing condition even if the user repeats wearing and removing multiple times, thus providing high reliability. If the correction filters the same in the frequency of use are included, the signal processing apparatus 10 may perform the search in the order of the amount of NC effect in (1) described above. Furthermore, when the correction filters having the same amount of NC effect are included in (1) described above, the signal processing apparatus 10 may perform the search in the order of the frequency of use in (4) described above. Then, the signal processing apparatus 10 may perform the search in the order of the amount of NC effect in (2) described above. Note that the above description is merely an example, and the order of searching is not limited to this description.

Next, a process of updating the memory storing the second correction filter will be described with reference to FIGS. 21A, 21B, 21C, 22A, 22B, 22C, 23A, 23B. 23C, 23D, and 24. Note that descriptions similar to those in FIGS. 18A, 18B, 18C and 20 will be omitted as appropriate.

FIG. 21A illustrates an initial state of a memory for the second correction filter. Hereinafter, the initial state of the memory for the second correction filter is referred to as "A. JEITA (through)" as appropriate, and the ambient sound thereof is referred to as "A. JEITA" as appropriate. In addition, the initial state and subsequent state of the memory of the second correction filter are hereinafter referred to as "n. Standard" as appropriate, and wearing information at that time is hereinafter referred to as "N. Standard" as appropriate. Furthermore, the correction filter is represented by a combination of "a" and "n". In FIG. 21A, the signal processing apparatus 10 accesses the memory for the second correction filter that is in the initial state.

FIG. 21B illustrates a state in which the amount of NC effect is stored that is obtained when the headphones 20 are used in "B. Train" while wearing nothing without performing the function of the optimization. Here, the amount of NC effect of "0.62" is stored in "NC filter (a-n) B. Train" during the state of "O. Unknown". In FIG. 21B, the signal processing apparatus 10 stores an actually measured value of the amount of NC effect in "NC filter (a-n) B. Train" during the state of "O. Unknown". The signal processing apparatus 10 stores ambient sound of "B. Train".

FIG. 21C illustrates a state in which the amount of NC effect is stored that is obtained when the user performs the function of the optimization in "B. Train". In FIG. 21C, the signal processing apparatus 10 estimates the second correction filter and the amount of NC effect. Here, the amount of NC effect of "0.72" is stored in "NC filter (b-n) B. Train" during the state of "O. Unknown". The signal processing apparatus 10 stores an estimated value of the amount of NC effect in "NC filter (b-n) B. Train" during the state of "O. Unknown". Then, the process proceeds to FIGS. 22A, 22B, and 22C.

In FIG. 22A, the signal processing apparatus 10 compares the actually measured value of "NC filter (a-n) B. Train" during the state of "O. Unknown" with the estimated value of "NC filter (b-n) B. Train". Specifically, the signal processing apparatus 10 compares the amount of NC effect of "0.62" that is the actually measured value of "NC filter (a-n) B. Train" during the state of "O. Unknown" with the amount of NC effect of "0.71" that is the estimated value of "NC filter (b-n) B. Train". The estimated value of "NC filter (b-n) B. Train" that is newly estimated is larger, and therefore, the signal processing apparatus 10 determines that this correction filter has higher NC performance, and updates the second correction filter. FIG. 22A illustrates a state in which the actually measured value of "NC filter (b-n) B. Train" that is obtained while the user wears the headphones 20.

FIG. 22B illustrates a state in which the amount of NC effect is stored that is obtained when the ambient sound changes while the user keeps to use the headphones 20 in "C. Bus". Here, the amount of NC effect of "0.66" is stored in "NC filter (b-n) C. Bus" during the state of "O. Unknown".

In FIG. 22B, the signal processing apparatus 10 stores an estimated value of the amount of NC effect in "C. Bus" in the state of "O. Unknown".

FIG. 22C illustrates a state in which the amount of NC effect is stored thereafter (e.g., at a later date) that is obtained when the user performs the optimization in a quiet environment (during the state of "P. No") while wearing nothing, such as glasses. In this case, the signal processing apparatus 10 clears all the values corresponding to the state of "O. Unknown" on the assumption that the headphones 20 may be worn and removed. The signal processing apparatus 10 determines that the state of "P. No" has a characteristic different from the state of "N. Standard" included in the memory, and estimates the correction filter (p) corresponding to "P. No". Furthermore, the signal processing apparatus 10 estimates the amounts of NC effect of "NC filter (a-p) A. JEITA" and "NC filter (a-n) A. JEITA" during the state of "P. No". Here, the amount of NC effect of "0.77" is stored in "NC filter (a-p) A. JEITA" during the state of "P. No", and the amount of NC effect of "0.68" is stored in "NC filter (a-n) A. JEITA". Then, according to a result of the estimation, the estimated value is larger in the estimated "NC filter (a-p) A. JEITA", and therefore, the signal processing apparatus 10 updates the second correction filter to the correction filter (p). Then, the process proceeds to FIGS. 23A, 23B, 23C, and 23D.

FIG. 23A illustrates a state in which the amounts of NC effect are stored that are obtained while the user keeps to use the headphones 20 in "B. Train" and "C. Bus". In FIG. 23A, the signal processing apparatus 10 stores estimated values of the amounts of NC effect in "B. Train" and "C. Bus" during the state of "P. No". Here, the amount of NC effect of "0.78" is stored in "B. Train" during the state of "P. No", and the amount of NC effect of "0.70" is stored in "C. Bus".

FIG. 23B illustrates a state in which the amounts of NC effect are stored thereafter (e.g., at a later date) that are obtained when the user uses the headphones 20 in "C. Bus" and "D. Airplane" while wearing the glasses without performing the function of the optimization after wearing the headphones 20. Here, since the user does not perform the function of the optimization after wearing the glasses, the amounts of NC effect are stored in "O. Unknown". In FIG. 23B, the signal processing apparatus 10 stores actually measured values of the amount of NC effect in "C. Bus" and "D. Airplane" during the state of "O. Unknown". Here, the amount of NC effect of "0.58" is stored in "C. Bus" during the state of "O. Unknown", and the amount of NC effect of "0.62" is stored in "D. Airplane".

FIG. 23C illustrates a state in which the amounts of NC effect are stored that are obtained when the user performs the function of the optimization in a quiet environment while wearing the headphones 20. The signal processing apparatus 10 determines that the state of "Q. Glasses" has a characteristic different from the states of "N. Standard" and "P. No", and estimates the correction filter (q) corresponding to "Q. Glasses". Furthermore, the signal processing apparatus 10 estimates the amounts of NC effects of "NC filter (a-p) A. JEITA", "NC filter (b-p) B. Train", and "NC filter (b-q) B. Train" during the state of "Q. Glasses". Here, the amount of NC effect of "0.74" is stored in "NC filter (a-p) A. JEITA" during the state of "Q. Glasses", the amount of NC effect of "0.66" is stored in "NC filter (b-p) B. Train", and the amount of NC effect of "0.77" is stored in "NC filter (b-q) B. Train".

In FIG. 23D, the estimated value of "NC filter (b-q) B. Train" that is newly estimated is larger, and therefore, the signal processing apparatus 10 determines that this NC performance is higher, and selects the correction filter (q) as the second correction filter. FIG. 23D illustrates a state in which the amounts of NC effect are stored that are obtained while the user keeps to use the headphones 20 in "C. Bus" and "D. Airplane". In FIG. 23D, the signal processing apparatus 10 stores estimated values of the amounts of NC effect in "C. Bus" and "D. Airplane" in a state where the user wears the headphones 20. Here, the amount of NC effect of "0.70" is stored in "C. Bus" during the state of "Q. Glasses", and the amount of NC effect of "0.78" is stored in "D. Airplane".

Figure 24:
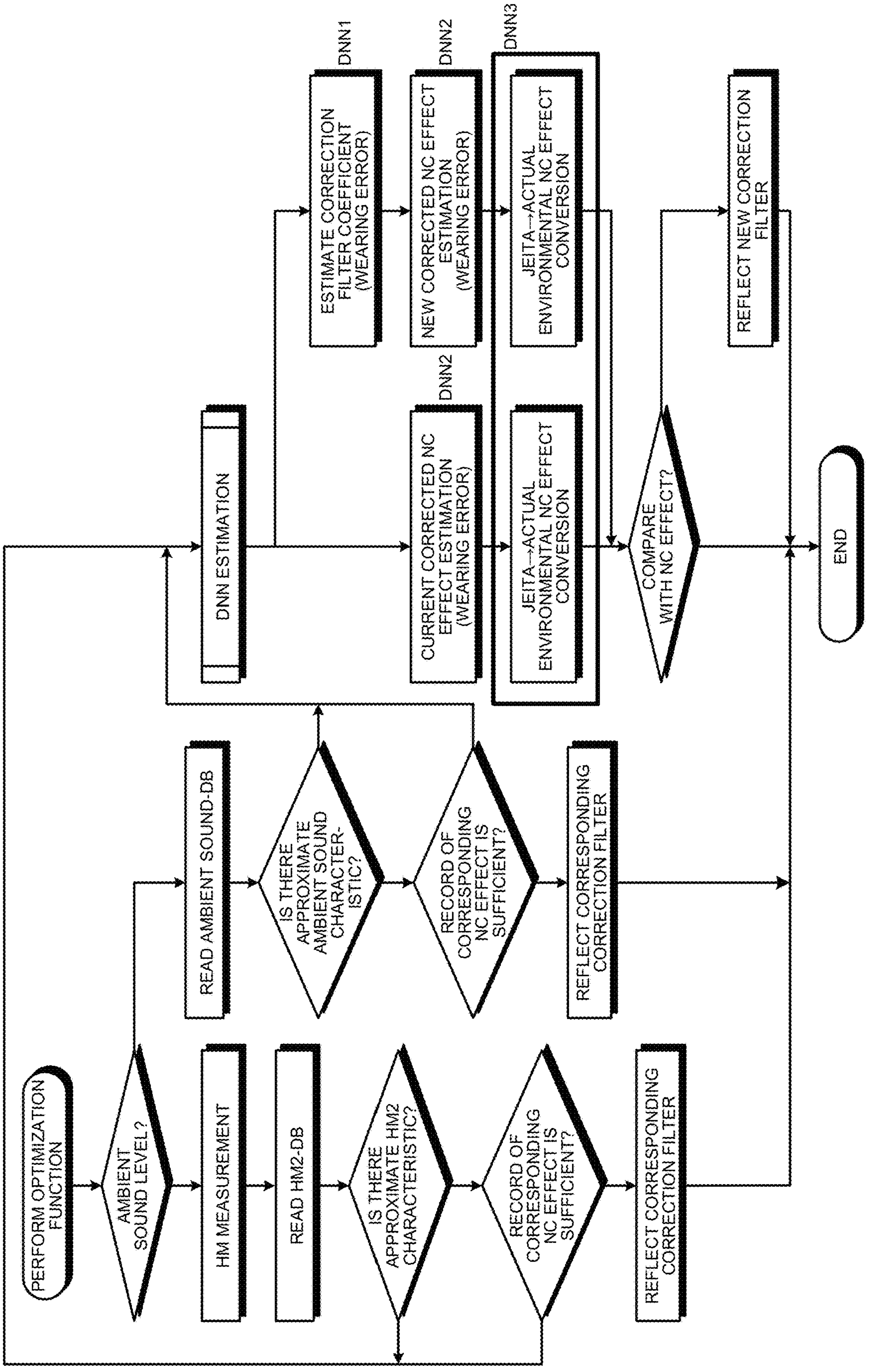
FIG. 24 is a diagram illustrating a procedure of a process of storing and referring to the correction filter according to an embodiment.

FIG. 24 is a flowchart illustrating a procedure of the processes according to FIGS. 21A, 21B, 21C, 22A, 22B, 22C, 23A, 23B, 23C, and 23D.

<2.8. Fifth DNN>

Next, optimization based on a result of estimation of the correction filter will be described. Here, the functions of the signal processing system 1 include a function of estimating the NC effect by using the NC filter having the predetermined filter coefficient. The signal processing system 1 uses the fifth DNN to estimate the NC effect. The fifth DNN will be described below.

In the fifth DNN, the H2 user M2 characteristic and the corrected filter coefficient are input, and the amount of NC effect is output. Note that, in the fifth DNN, in addition to the above description, the H2M2 characteristic may be input. In the fifth DNN, optimization using the Adam is performed as an example of an optimization method. In the fifth DNN, a loss function based on the mean square error is used. In the fifth DNN, the simulation of NC is performed using the training data generated by the first DNN, and the amount of NC effect obtained as a result of the simulation is used as training data.

<2.9. Sixth DNN>

Next, optimization based on the environment set according to the predetermined standard will be described. Here, the functions of the signal processing system 1 include a function of estimating the NC effect in the environment set according to the predetermined standard. The signal processing system 1 uses the sixth DNN to estimate the NC effect. The sixth DNN will be described below.

In the sixth DNN, the amount of NC effect in a noise environment according to a predetermined standard, the corrected filter coefficient, and a characteristic of the ambient sound in the use environment of the user are input, and the amount of NC effect in the use environment of the user is output. In the sixth DNN, the loss function based on the mean square error is used. In the sixth DNN, the amount of NC effect obtained as a result of the simulation of NC is used as the training data. For example, in the sixth DNN, simulation of NC is performed using the NC filter, the correction filter, and data such as sound data (e.g., sound data of ambient sound measured by the first microphone to the third microphone) and characteristics, and the amounts of NC effect obtained as a result of the simulation are used as the training data.

<2.10. Exemplary Functional Configuration>

Figure 25:
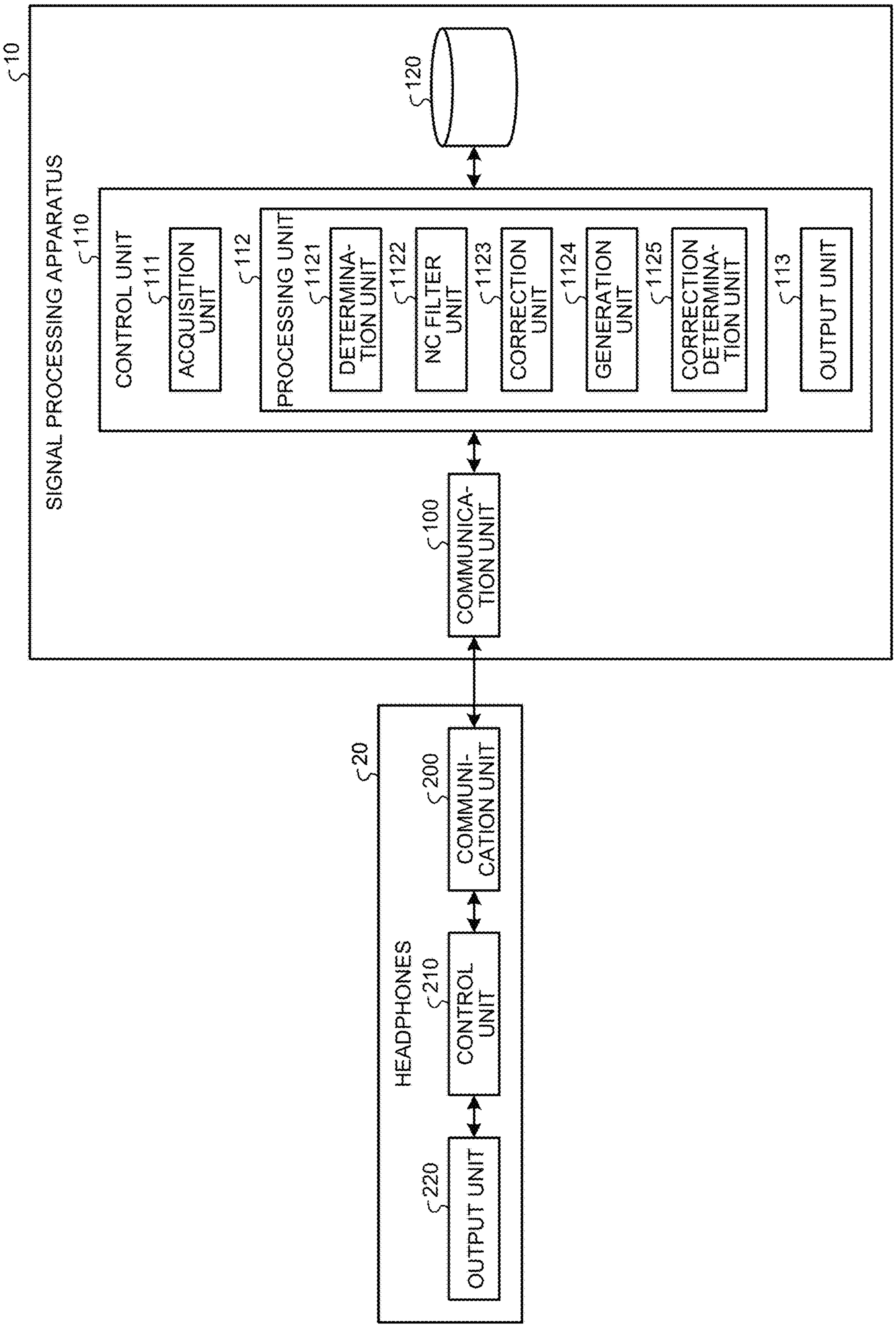
FIG. 25 is a diagram illustrating a block diagram of the signal processing system according to an embodiment.

FIG. 25 is a diagram illustrating an exemplary functional configuration of the signal processing system 1 according to the embodiment.

(1) Signal Processing Apparatus 10

As illustrated in FIG. 25, the signal processing apparatus 10 includes a communication unit 100, a control unit 110, and the storage unit 120. Note that the signal processing apparatus 10 includes at least the control unit 110.

(1-1) Communication Unit 100

The communication unit 100 has a function of communicating with an external device. For example, in communication with the external device, the communication unit 100 outputs information received from the external device to the control unit 110. Specifically, the communication unit 100 outputs the information received from the headphones 20 to the control unit 110. For example, the communication unit 100 outputs the signals collected by the microphones included in the headphones 20 to the control unit 110.

In communication with the external device, the communication unit 100 transmits information input from the control unit 110 to the external device. Specifically, the communication unit 100 transmits information about acquisition of a collected sound signal input from the control unit 110 to the headphones 20. The communication unit 100 includes a hardware circuit (e.g., a communication processor) so that processing may be performed by a computer program running on the hardware circuit or running on another processing device (e.g. a CPU) controlling the hardware circuit.

(1-2) Control Unit 110

The control unit 110 has a function of controlling the operation of the signal processing apparatus 10. For example, the control unit 110 performs processing of determining the correction filter coefficient to perform the optimal NC for the individual user.

In order to implement the above-described functions, the control unit 110 includes an acquisition unit 111, a processing unit 112, and an output unit 113 as illustrated in FIG. 25. The control unit 110 includes a processor such as a CPU so that software (computer program) implementing each function of the acquisition unit 111, the processing unit 112, and the output unit 113 may be read from the storage unit 120 to perform processing. Furthermore, at least one of the acquisition unit 111, the processing unit 112, and the output unit 113 include another hardware circuit (processor etc.) different from the control unit 110 so as to be controlled by a computer program running on the another hardware circuit or on the control unit 110.

Acquisition Unit 111

The acquisition unit 111 has a function of acquiring the acoustic characteristic in the user's ear isolated from the outside world. For example, the acquisition unit 111 acquires the acoustic characteristic based on a collected sound signal obtained by collecting the measurement sound output into the ear. For example, the acquisition unit 111 acquires the acoustic characteristic based on the collected sound signal collected by a microphone of the sound output device.

The acquisition unit 111 acquires data stored in the storage unit 120. For example, the acquisition unit 111 acquires information about the correction filter coefficient.

Processing Unit 112

The processing unit 112 has a function for controlling processing in the signal processing apparatus 10. As illustrated in FIG. 25, the processing unit 112 includes a determination unit 1121, an NC filter unit 1122, a correction unit 1123, a generation unit 1124, and a correction determination unit 1125. The determination unit 1121, the NC filter unit 1122, the correction unit 1123, the generation unit 1124, and the correction determination unit 1125 of the processing unit 112 may be each configured as an independent computer program module, or the functions may be configured as one integrated computer program module.

Determination Unit 1121

The determination unit 1121 has a function of determining the correction filter coefficient on the basis of the acoustic characteristic acquired by the acquisition unit 111.

The determination unit 1121 determines the correction filter coefficient by using a trained model (e.g., the first DNN) in which the acoustic characteristic is input and the filter coefficient is output. For example, the determination unit 1121 determines the correction filter coefficient by using the trained model that has learned, as the training data, the acoustic characteristic estimated at the user's eardrum position.

The determination unit 1121 determines the correction filter coefficient by using the trained model (e.g., the second DNN) in which the acoustic characteristic and sound data are input and whether to correct the sound data is output. For example, the determination unit 1121 determines the correction filter coefficient by using the trained model that has learned, as the training data, given information labeled to indicate whether to perform correction on the basis of the noise suppression ratio estimated on the basis of the acoustic characteristic and sound data.

The determination unit 1121 determines the correction filter coefficient by using the trained model (e.g., the third DNN) in which the acoustic characteristic, the acoustic characteristic measured in advance, and the sound data are input and the noise suppression ratio is output. For example, the determination unit 1121 determines the correction filter coefficient by using the trained model that has learned, as the training data, the noise suppression ratio obtained on the basis of both of the acoustic characteristic estimated at the user's eardrum position and the sound data.

The determination unit 1121 determines the correction filter coefficient by using the trained model (the fourth DNN) in which the collected sound signal collected by a microphone different from the microphone having measured the acoustic characteristic and the sound data are input and the correction filter coefficient correcting a difference in filter coefficient based on the ambient sound in a user environment is output. For example, the determination unit 1121 determines the correction filter coefficient by using the trained model that has learned, as the training data, the filter coefficient correcting a difference in filter coefficient based on the acoustic characteristic estimated at the user's eardrum position.

The determination unit 1121 determines the correction filter coefficient by using the trained model (e.g., the fifth DNN) in which the acoustic characteristic and the sound data are input and the amount of NC effect is output. For example, the determination unit 1121 determines the correction filter coefficient by using the trained model that has learned, as the training data, the amount of effect based on the acoustic characteristic estimated at the user's eardrum position.

The determination unit 1121 determines the correction filter coefficient by using the trained model (the sixth DNN) in which the amount of NC effect in the environment set according to the predetermined standard, the sound data, and the acoustic characteristic of the ambient sound in the user environment are input, and the amount of NC effect in the user environment is output. For example, the determination unit 1121 determines the correction filter coefficient by using the trained model that has learned, as the training data, the amount of NC effect based on the sound data, the filter coefficient, and the acoustic characteristic of the ambient sound in the user environment.

NC Filter Unit 1122

The NC filter unit 1122 has a function of generating the sound data having a phase opposite to the ambient sound leaking into the user's ear. For example, the NC filter unit 1122 generates the sound data having a phase opposite to the acoustic characteristic of the ambient sound acquired by the acquisition unit 111.

Correction Unit 1123

The correction unit 1123 has a function of correcting the sound data generated by the NC filter unit 1122 by using the correction filter. Specifically, the correction unit 1123 performs correction by using the correction filter coefficient determined by the determination unit 1121.

Generation Unit 1124

The generation unit 1124 has a function of generating the trained model. For example, the generation unit 1124 generates the trained model that has learned input data and output data having been input to the loss function. The determination unit 1121 determines the correction filter coefficient estimated using the trained model generated by the generation unit 1124.

Correction Determination Unit 1125

The correction determination unit 1125 has a function of determining whether to correct the sound data generated by the NC filter unit 1122 by using the correction filter. For example, the correction determination unit 1125 uses the correction filter, to determine whether or not a sufficient correction effect can be expected, and determines the correction using the correction filter when the sufficient correction effect can be expected.

The correction determination unit 1125 determines the noise level of the ambient sound. The correction determination unit 1125 determines whether which one of the first correction filter and the second correction filter is to be used according to the noise level of the ambient sound.

Output Unit 113

The output unit 113 has a function of outputting the sound data corrected by the correction unit 1123. The output unit 113 provides the corrected sound data to, for example, the headphones 20 via the communication unit 100. When receiving the corrected sound data, the headphones 20 reproduce sound based on the corrected sound data. This configuration makes it possible for the user to try to listen to the sound corrected by the correction filter.

(1-3) Storage Unit 120

The storage unit 120 is implemented by, for example, a semiconductor memory device such as a random access memory (RAM) or flash memory, or a storage device such as a hard disk or optical disk. The storage unit 120 has a function of storing computer programs and data (including a form of a program) related to processing in the signal processing apparatus 10.

FIG. 26 illustrates an example of the storage unit 120. As illustrated in FIG. 26, the storage unit 120 may include items such as "correction filter coefficient ID", "correction filter coefficient", "performing state", "use environment 1", and "use environment 2".

"Correction filter coefficient ID" indicates identification information for identifying the correction filter coefficient. "Correction filter coefficient" indicates the correction filter coefficient. "Performing state" indicates a performing state of an optimization function. In FIG. 26, an example in which conceptual information such as "performing state #1" and "performing state #2" is stored in "performing state" has been illustrated. However, in practice, data such as "N. Standard" and "O. Unknown" is stored. "Use environment 1" and the like indicate the use environment of the user. In the example illustrated in FIG. 26, conceptual information such as "use environment #1" and "use environment #2" are stored in "use environment 1". However, in practice, data such as "B. Train" and "C. Bus" are stored.

(2) Headphones 20

As illustrated in FIG. 25, the headphones 20 include a communication unit 200, a control unit 210, and an output unit 220.

(2-1) Communication Unit 200

The communication unit 200 has a function of communicating with an external device. For example, in communication with the external device, the communication unit 200 outputs information received from the external device to the control unit 210. Specifically, the communication unit 200 outputs information received from the signal processing apparatus 10 to the control unit 210. For example, the communication unit 200 outputs information about acquisition of the sound data corrected by the correction filter, to the control unit 210.

(2-2) Control Unit 210

The control unit 210 has a function of controlling the operation of the headphones 20. For example, the control unit 210 transmits the acoustic characteristic based on the collected sound signal collected by a microphone to the signal processing apparatus 10 via the communication unit 200.

(2-3) Output Unit 220

The output unit 220 is implemented by a member that is configured to output sound, such as a speaker. The output unit 220 outputs sound based on the sound data.

<2.11. Process in Signal Processing System>

The functions of the signal processing system 1 according to the embodiment have been described. Next, a process in the signal processing system 1 will be described.

Figure 27:
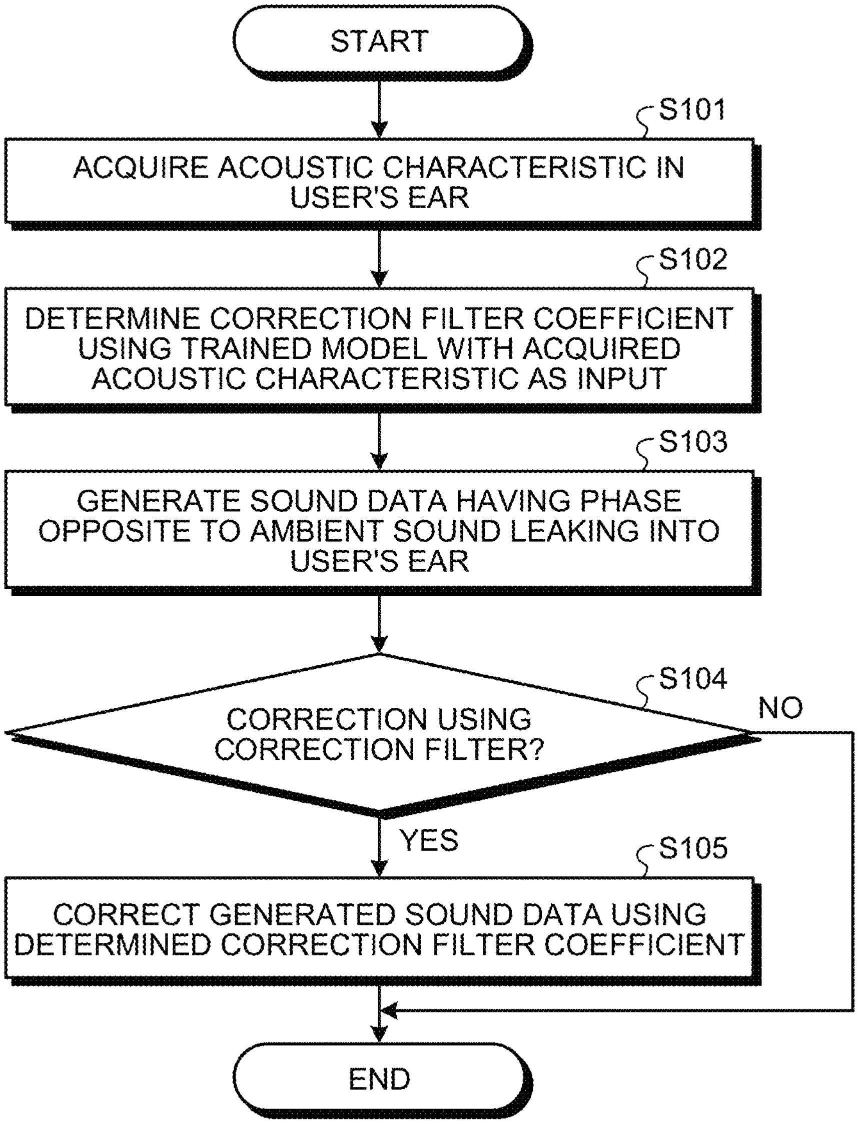
FIG. 27 is a flowchart illustrating a procedure of processing in a signal processing apparatus according to an embodiment.

FIG. 27 is a flowchart illustrating a procedure of processing in the signal processing apparatus 10 according to the embodiment. The signal processing apparatus 10 acquires the acoustic characteristic in the user's ear, isolated from the outside world (S101). Next, the signal processing apparatus 10 determines the correction filter coefficient by using the trained model in which the correction filter coefficient is output upon input of the acquired acoustic characteristic (S102). Then, the signal processing apparatus 10 generates the sound data having a phase opposite to the ambient sound leaking into the user's ear (S103). Next, the signal processing apparatus 10 determines whether to perform correction using the correction filter (S104). When determining the performance of the correction using the correction filter (S104; YES), the signal processing apparatus 10 corrects the generated sound data by using the determined correction filter coefficient (S105). Furthermore, when determining non-performance of the correction using the correction filter (S104; NO), the signal processing apparatus 10 finishes information processing.

<2.12. Variations of Processing>

(Selection of Correction Filter with UI)

In the above embodiment, the example has been described in which the signal processing apparatus 10 determines whether to perform correction by using the machine learning such as DNN, but determination whether to perform correction by the signal processing apparatus 10 is not limited to this example. For example, the signal processing apparatus 10 may determine whether to perform the correction by receiving selection from the user.

It depends on user's subjectivity whether the user is more comfortable as the amount of NC effect increases. An example in which increasing amount of NC effect reduces user's comfort includes considerable suppression of mid-bas noise leading to unpleasant enhancement of high-tone noise having been masked by the mid-bass noise. The signal processing apparatus 10 may determine whether to perform the correction by presenting the amount of NC effect using the current filter coefficient, the amount of NC effect using the estimated correction filter coefficient, the amount of NC effect of the correction filter coefficient stored in the memory, and the like and receiving selection from the user. For example, the signal processing apparatus 10 may cause a mobile terminal such as a smartphone (hereinafter, appropriately referred to as "terminal device 30") to display a list of the correction filters, for receiving selection from the user. For example, the signal processing apparatus 10 may cause the mobile terminal to display the list of the correction filters according to the wearing condition of the user. Therefore, the signal processing apparatus 10 allows the user to explicitly select the correction filter. Furthermore, the signal processing apparatus 10 can be configured so that the user may confirm the amount of NC effect on the basis of any ambient sound.

Figure 28:
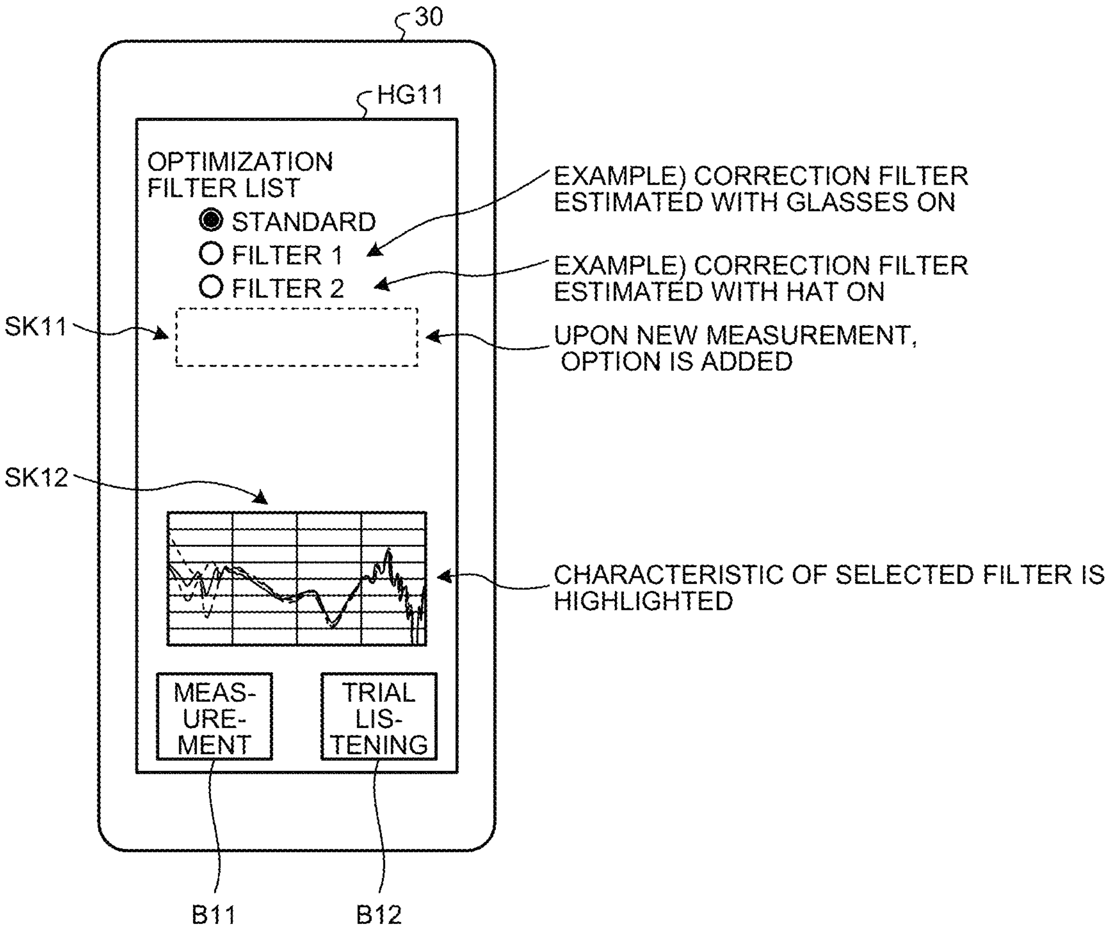
FIG. 28 is a diagram illustrating an example of a display screen displaying a list of the correction filters according to an embodiment.

FIG. 28 illustrates an example of a display screen displaying a list of the correction filters. In FIG. 28, the list of correction filters includes "standard", "filter 1", and "filter 2". Here, "standard" is, for example, a correction filter estimated by the signal processing apparatus 10 when the user wears nothing. "Filter 1" is, for example, a correction filter estimated by the signal processing apparatus 10 when the user wears glasses. "Filter 2" is, for example, a correction filter estimated by the signal processing apparatus 10 when the user wears a hat. In FIG. 28, the display screen HG11 displaying the list of the correction filters includes thereon a predetermined field SK11 to which a correction filter based on new measurement is added as an option when the user operates (e.g., clicks or taps) measurement B11. In addition, the display screen HG11 includes a predetermined field SK12 in which the characteristic of a correction filter selected by the user is highlighted. In addition, when the user operates trial listening Cll on the display screen HG11, the terminal device 30 outputs, for example, sound based on the correction filter selected by the user.

When receiving an operation on the trial listening Cll, the signal processing apparatus 10 may perform processing for outputting the sound based on the correction filter selected by the user. This configuration makes it possible for the user to try to listen to the sound based on the selected correction filter. Here, upon trial listening, the signal processing apparatus 10 may select and reproduce sound (e.g., music) stored in the terminal device 30 so that the user may readily recognize a difference between the correction filters included in the list. Alternatively, the signal processing apparatus 10 may reproduce any sound selected in advance by the user. Therefore, the signal processing apparatus 10 can readily perform comparation between the correction filters in the use environment of the user. Furthermore, the signal processing apparatus 10 may perform processing for causing to display the H2 user M2 characteristic. This configuration makes it possible for the signal processing apparatus 10 to cause the user to visually understand the H2 user M2 characteristic. Furthermore, the signal processing apparatus 10 may perform processing for enabling the user to name each correction filter, on UI of the terminal device 30. Therefore, the signal processing apparatus 10 is configured to allow the user to give names, thereby facilitating the user to selectively use the correction filters. At this time, ease of understanding information displayed on the UI or ease of operation on the UI may degrade. Therefore, the signal processing apparatus 10 may perform processing for enabling the user to make comparation in the trial listening as well by using audio guide or the like, with only the UI for the headphones 20. Furthermore, the signal processing apparatus 10 may perform processing for performing the process of estimation of the correction filter coefficient, on the terminal device 30 of the user or a server to which the terminal device 30 is connected.

Figure 29:
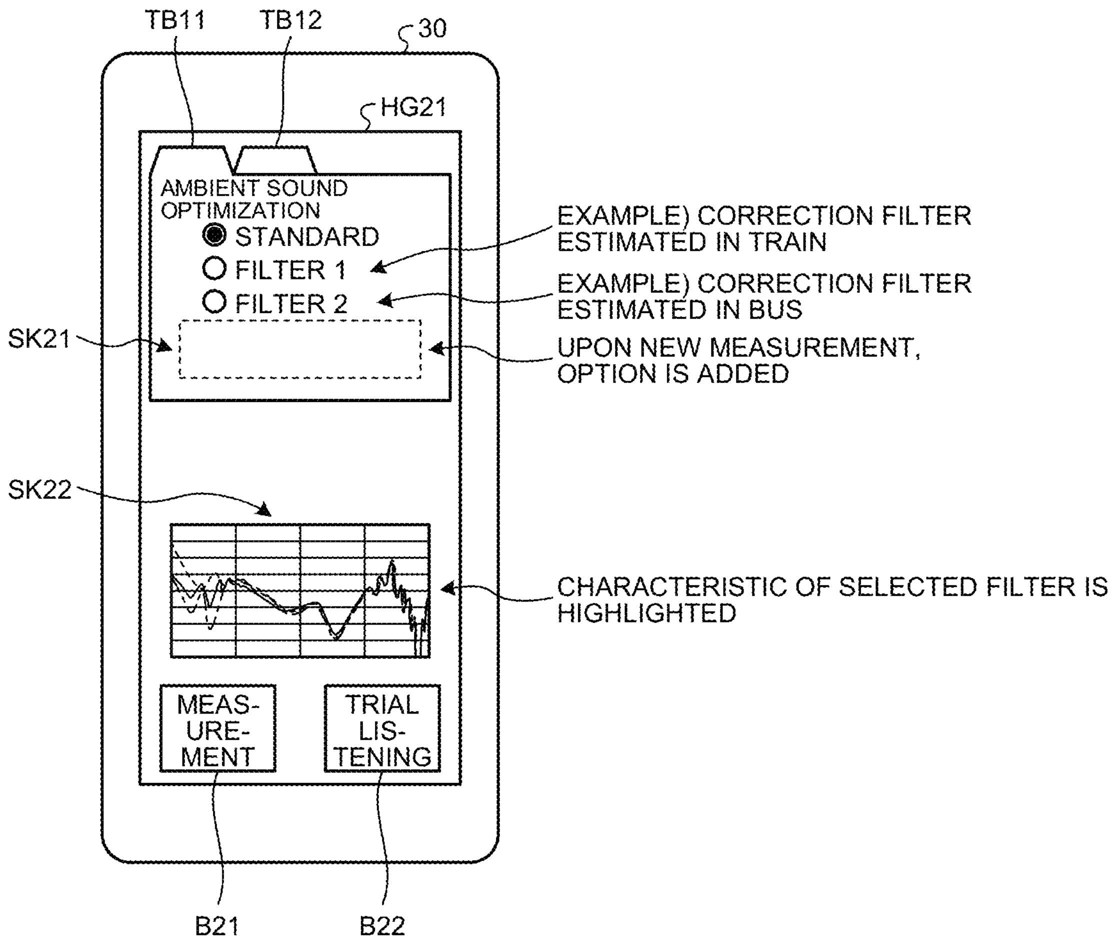
FIG. 29 is a diagram illustrating an example of a display screen displaying a list of the correction filters according to an embodiment.

Next, management and operation of the correction filter for the error in the ambient sound, on the terminal device 30 will be described. Here, the display screen of the terminal device 30 is provided with a tab for correcting wearing error and a tab for correcting a difference in the ambient sounds so that the lists of the correction filters are switched when the user selects any of the tabs. FIG. 29 illustrates an example of a display screen for management and selection of a list of the first correction filters and a list of the second correction filters by using the tabs. Note that description similar to that in FIG. 28 will be omitted as appropriate. The display screen HG21 includes a tab TB11 and a tab TB12 for switching the lists of the correction filters by user selection. When the user selects the tab TB11 or the tab TB12 on the display screen HG21, the terminal device 30 displays any list of the correction filters corresponding to the tab TB11 or tab TB12. The signal processing apparatus 10 may perform processing for switching to the list of the correction filters corresponding to the tab selected by the user, when receiving the user selection, This configuration makes it possible for the user to manage and select the correction filters separately according to the type of the correction filter. Furthermore, the signal processing apparatus 10 may cause to display an acoustic characteristic of ambient sound targeted by the default NC filter of the product and an acoustic characteristic of ambient sound in the user environment, when the tab for the second correction filter is selected Therefore the user can use this configuration as a reference for selection.

Note that the terminal device 30 according to the embodiment may be, not limited to a mobile terminal such as a smartphone, any information processing device as long as the information processing device is configured to receive an operation for the correction filter from the user.

(Processing for Ambient Sound Changing at any Time)

Figure 30:
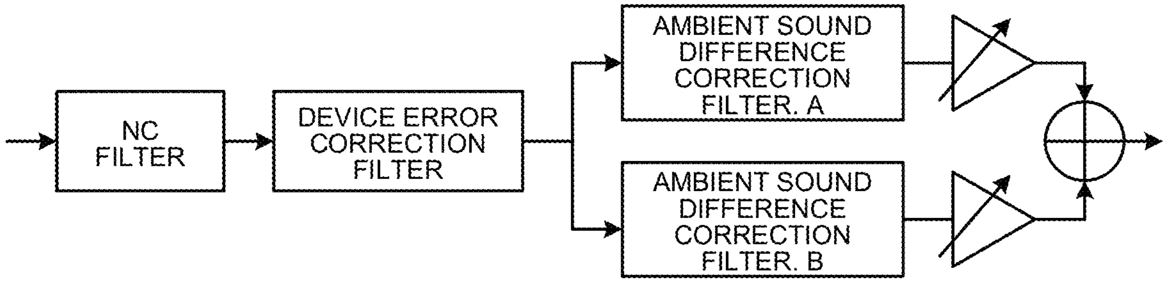
FIG. 30 is a diagram illustrating an overview of a function for updating the correction filter according to an embodiment.

In the above embodiment, updating the correction filter coefficient estimated on the basis of the user's operation by the signal processing apparatus 10 has been described, but update by the signal processing apparatus 10 is not limited to this example. The signal processing apparatus 10 may update at any time the correction filter coefficient estimated for the ambient sound changing at any time. As illustrated in FIG. 30, the signal processing apparatus 10 may update the correction filter coefficient following the change in the ambient sound by crossfading the correction filters. This configuration makes it possible for the signal processing apparatus 10 to update the correction filter coefficient without sound interruption or discomfort. Note that the signal processing apparatus 10 may update the correction filter coefficient on the basis of any processing, in addition to the crossfade.

(Estimation of NC Filter)

In the above embodiment, estimation of the correction filter coefficient for a difference in the ambient sound by the signal processing apparatus 10 has been described, but the filter coefficient of the NC filter may be estimated. For example, the signal processing apparatus 10 may estimate the filter coefficient that minimizes the collected sound signal collected by the third microphone based, on the basis of the collected sound signal collected by the first microphone and the collected sound signal collected by the third microphone. In the above embodiment, use of the correction filter coefficient estimated on the basis of various ambient sounds as the training data by the signal processing apparatus 10 has been described, but the correction filter coefficient may be estimated by determining a reference filter coefficient.

(Processing for Adjusting Gain)

In the above embodiment, determination of the correction filter coefficient and performance of correction with the determined correction filter coefficient by the signal processing apparatus 10 has been described. Here, the signal processing apparatus 10 may perform correction by adjusting the gain of the filter without determining the correction filter coefficient. In the correction, the signal processing apparatus 10 may add an offset on the basis of an error between the H2M2 characteristic and the H2 user M2 characteristic. Furthermore, the signal processing apparatus 10 may adjust this offset to calculate an offset value that minimizes the sum of squares of the error. When the minimum sum of squared error of the offset value is smaller than a predetermined threshold, the signal processing apparatus 10 may perform correction with the offset value as an adjustment value for the gain. Furthermore, the signal processing apparatus 10 may receive adjustment from the user on the basis of the offset value. Therefore, the signal processing apparatus 10 is allowed to perform adjustment according to the user's subjective preference or how the user hears sound. Furthermore, when the minimum sum of squared error of the offset value is larger than the predetermined threshold, the signal processing apparatus 10 may estimate the correction filter coefficient.

Figure 31A:
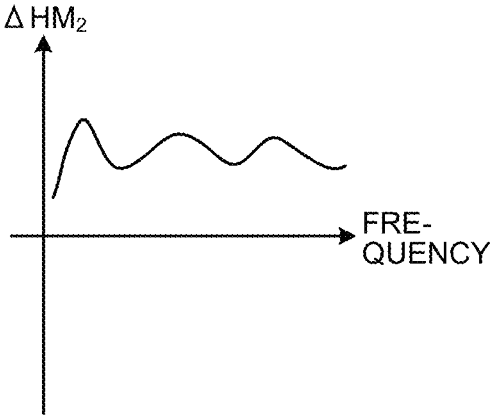
FIGS. 31A and 31B are graphs illustrating an overview of a function in adjusting a gain of the correction filter according to an embodiment.
Figure 31B:
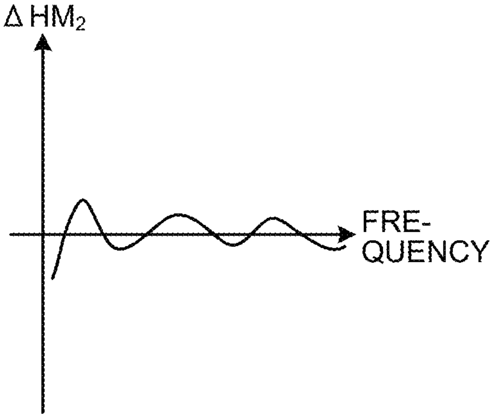

FIGS. 31A and 31B illustrate the minimum sum of squared error of the offset value smaller than the predetermined threshold. FIG. 31A illustrates a state before adjusting the gain, and FIG. 31B illustrates a state after adjusting the gain.

Figure 32A:
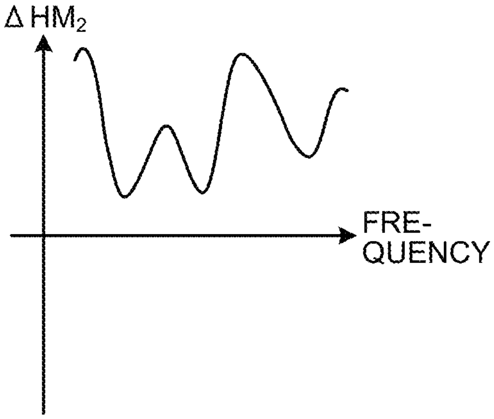
FIGS. 32A and 32B are graphs illustrating an overview of a function in adjusting a gain of the correction filter according to an embodiment.
Figure 32B:
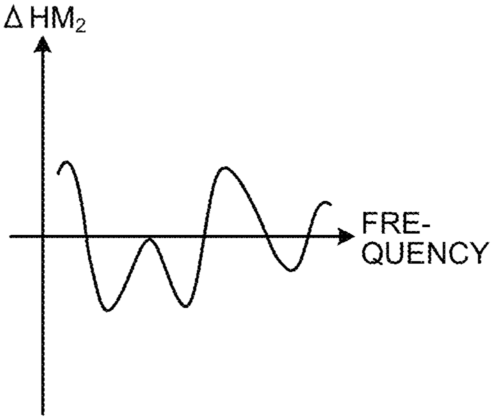

FIGS. 32A and 32B illustrate the minimum sum of squared error of the offset value larger than the predetermined threshold. FIG. 32A illustrates a state before adjusting the gain, and FIG. 32B illustrates a state after adjusting the gain.

Figure 33:
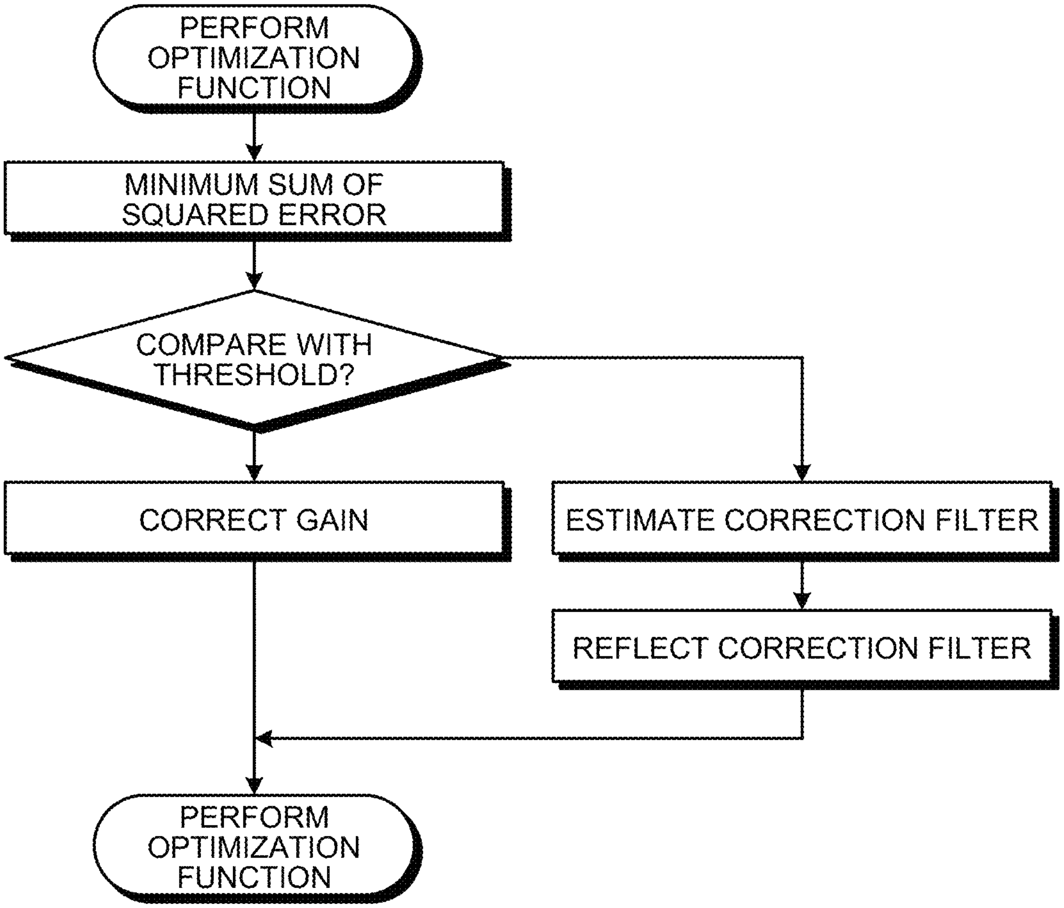
FIG. 33 is a flowchart illustrating a procedure of a process for adjusting the gain of the correction filter according to an embodiment.

FIG. 33 is a flowchart illustrating a procedure of a process for adjusting the gain.

(Correction of Error)

Note that, in the above embodiment, the correction of the error on the basis of the individual differences between users and the wearing condition has been described, but the correction is not limited thereto. The correction according to the embodiment includes, for example, correction of an error based on individual differences of the headphones 20 or the like.

3. Exemplary Hardware Configuration

Figure 34:
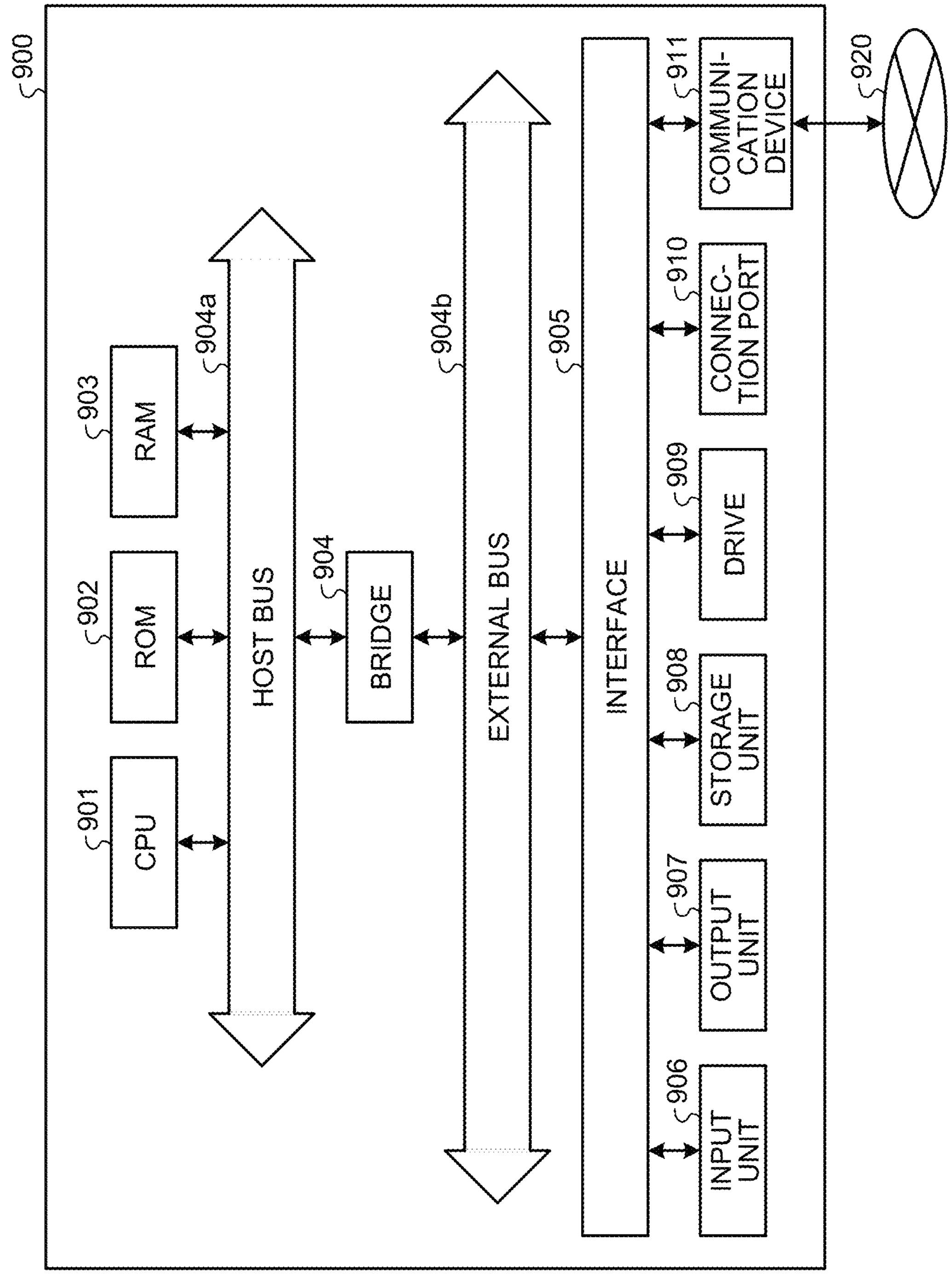
FIG. 34 is a diagram illustrating an exemplary hardware configuration of the signal processing apparatus according to an embodiment.

Finally, an exemplary hardware configuration of the signal processing apparatus according to the embodiment will be described with reference to FIG. 34. FIG. 34 is a block diagram illustrating the exemplary hardware configuration of the signal processing apparatus according to an embodiment. Note that a signal processing device 900 illustrated in FIG. 34 can implement, for example, the signal processing apparatus 10 and the headphones 20 which are illustrated in FIG. 25. Information processing by the signal processing apparatus 10 and the headphones 20 according to the embodiment is implemented in cooperation with the software (including computer program) and hardware which is described below.

As illustrated in FIG. 34, the signal processing device 900 includes a central processing unit (CPU) 901, a read only memory (ROM) 902, and a random access memory (RAM) 903. Furthermore, the signal processing device 900 includes a host bus 904*a*, a bridge 904, an external bus 904*b*, an interface 905, an input device 906, an output device 907, a storage device 908, a drive 909, a connection port 910, and a communication device 911. Note that the hardware configuration shown here is merely an example, and some of the component elements may be omitted. In addition, a component element other than the component elements shown here may be further included.

The CPU 901 functions as, for example, an arithmetic processing device or a control device, and controls all or part of the operations of the component elements on the basis of various computer programs recorded in the ROM 902, the RAM 903, or the storage device 908. The ROM 902 is a unit that stores a program read by the CPU 901, data used for calculation, and the like. The RAM 903 temporarily or permanently stores, for example, a program read by the CPU 901, and data such as various parameters changing as appropriate upon running the program. These component elements are mutually connected by the host bus 904*a* including a CPU bus or the like. The CPU 901, the ROM 902, and the RAM 903 can implement the functions of the control unit 110 and the control unit 210 which have been described with reference to FIG. 25, for example, in cooperation with the software.

The CPU 901, the ROM 902, and the RAM 903 are mutually connected, for example, via the host bus 904*a* configured to transmit data at high speed. Meanwhile, the host bus 904*a* is connected to, for example, the external bus 904*b* configured to transmit data at relatively low speed, via the bridge 904. In addition, the external bus 904*b* is connected to various component elements via the interface 905.

The input device 906 is implemented by a device into which information is input by a listener, such as a mouse, keyboard, touch panel, button, microphone, switch, and lever. Furthermore, the input device 906 may be, for example, a remote-control device using an infrared ray or another radio wave, or may be an external connection device that corresponds to the operation of the signal processing device 900, such as a mobile phone or PDA. Furthermore, the input device 906 may include, for example, an input control circuit or the like that generates an input signal on the basis of information input using the input means described above and outputs the input signal to the CPU 901. The administrator of the signal processing device 900 can operate the input device 906 to input various data to the signal processing device 900 or give an instruction for the signal processing device 900 to perform processing operation.

In addition, the input device 906 can include a device that detects the position of the user. For example, the input device 906 can include various sensors such as an image sensor (e.g., camera), depth sensor (e.g., stereo camera), acceleration sensor, gyro sensor, geomagnetic sensor, optical sensor, sound sensor, distance measurement sensor (e.g., time of flight (ToF) sensor), and force sensor. Furthermore, the input device 906 may acquire information about the signal processing device 900 itself, such as the attitude and movement speed of the signal processing device 900, and information about a space around the signal processing device 900, such as brightness and noise around the signal processing device 900. Furthermore, the input device 906 may include a GNSS module that receives a GNSS signal (e.g., GPS signal from a global positioning system (GPS) satellite) from a global navigation satellite system (GNSS) satellite and measures position information including the latitude, longitude, and altitude of the device. Furthermore, for the position information, the input device 906 may detect the position by transmission and reception with Wi-Fi (registered trademark), a mobile phone, PHS, smartphone, or the like, near field communication, or the like. The input device 906 can implement the function of, for example, the acquisition unit 111 which has been described with reference to FIG. 25.

The output device 907 includes a device configured to visually or audibly notify the user of information acquired. Examples of such a device include a display device such as a CRT display device, liquid crystal display device, plasma display device, EL display device, laser projector, LED projector, and lamp, a sound output device such as a speaker and headphones, a printer device, and the like. The output device 907 outputs, for example, results obtained from various processing performed by the signal processing device 900. Specifically, the display device visually displays the results obtained from various processing performed by the signal processing device 900, in various formats such as text, image, tables, graph, and the like. Meanwhile, the sound output device converts an audio signal including voice data, sound data, or the like reproduced, into an analog signal, and aurally outputs the analog signal. The output device 907 can implement, for example, the functions of the output unit 113 and the output unit 220 which have been described with reference to FIG. 25.

The storage device 908 is a data storage device that is formed as an example of a storage unit of the signal processing device 900. The storage device 908 is implemented by, for example, a magnetic storage device such as HDD, a semiconductor storage device, an optical storage device, a magneto-optical device, or the like. The storage device 908 may include a storage medium, a recording device that records data in the storage medium, a reading device that reads data from the storage medium, a deletion device that deletes data recorded in the storage medium, and the like. The storage device 908 stores a computer program executed by the CPU 901, various data, various data acquired from outside, and the like. The storage device 908 can implement, for example, the function of the storage unit 120 which has been described with reference to FIG. 25.

The drive 909 is a storage medium reader/writer, and is built in or externally mounted to the signal processing device 900. The drive 909 reads information recorded in a removable storage medium such as a mounted magnetic disk, optical disk, magneto-optical disk, or semiconductor memory, and outputs the information to the RAM 903. In addition, the drive 909 is configured to write information on the removable storage medium.

The connection port 910 is, for example, a port for connecting an external connection device such as a universal serial bus (USB) port, IEEE1394 port, small computer system interface (SCSI), RS-232C port, or optical audio terminal.

The communication device 911 is a communication interface including, for example, a communication device or the like for connection to a network 920. The communication device 911 is a communication card or the like, such as for a wired or wireless local area network (LAN), long term evolution (LTE), Bluetooth (registered trademark), or wireless USB (WUSB). Furthermore, the communication device 911 may be a router for optical communication, a router for an asymmetric digital subscriber line (ADSL), a modem for various communications, or the like. The communication device 911 is configured to transmit/receive a signal or the like between, for example, the Internet or another communication device according to a predetermined protocol such as TCP/IP. The communication device 911 can implement, for example, the functions of the communication unit 100 and the communication unit 200 which have been described with reference to FIG. 25.

Note that the network 920 is a wired or wireless transmission path for information transmitted from devices connected to the network 920. For example, the network 920 may include a public network such as the Internet, a telephone network, or a satellite communication network, various local area networks (LANs) including Ethernet (registered trademark), a wide area network (WAN), or the like. Furthermore, the network 920 may include a private network such as an Internet protocol-virtual private network (IP-VPN).

The example of the hardware configuration capable of implementing the functions of the signal processing device 900 according to the embodiment has been described above. Each of the component elements described above may be implemented using a general-purpose member, or may be implemented using hardware dedicated to the function of each component element.

Accordingly, the hardware configuration to be used can be changed as appropriate according to the technical level when the present embodiment is carried out.

4. Conclusion

As described above, the signal processing apparatus 10 according to the embodiment performs the processing of determining the correction filter coefficient, on the basis of the acoustic characteristic in the user's ear isolated from the outside world. Furthermore, the signal processing apparatus 10 performs processing of correcting the sound data having a phase opposite to the ambient sound leaking into the user's ear, by using the correction filter. This configuration makes it possible for the signal processing apparatus 10 to determine the correction filter coefficient for optimization without requiring, for example, an acoustic signal at the eardrum position where mounting the product is difficult. Furthermore, the signal processing apparatus 10 performs correction using the correction filter, and thus, the improvement in the NC effect can be promoted.

Therefore, it is possible to provide the new and improved signal processing apparatus, signal processing method, signal processing model production method, and sound output device that are configured to promote further improvement in usability.

Preferred embodiments of the present disclosure have been described above in detail with reference to the accompanying drawings, but the technical scope of the present disclosure is not limited to these examples. A person skilled in the art may obviously find various alternations and modifications within the technical concept described in claims, and it should be understood that the alternations and modifications will naturally come under the technical scope of the present disclosure.

For example, the respective devices described in the present description may be implemented as a single device, or some or all of the devices may be implemented as separate devices. For example, the signal processing apparatus 10 and the headphones 20 illustrated in FIG. 25 may be implemented as separate devices. Furthermore, for example, the signal processing apparatus 10 and the headphones 20 may be connected via a network or the like and implemented as a server device. Furthermore, a server device connected via a network or the like may have the function of the control unit 110 included of the signal processing apparatus 10.

Furthermore, a series of processing steps by the respective devices described in the present description may be implemented using any of software, hardware, and a combination of the software and the hardware. The computer programs constituting the software are stored in advance in, for example, a recording media (non-transitory media) provided inside or outside the devices. Then, each program is read into, for example, the RAM upon execution by the computer and is executed by the processor such as the CPU.

Furthermore, the processes having been described using the flowcharts in the present specification may not necessarily be executed in the order illustrated. Some processing steps may be performed in parallel. In addition, an additional processing step may be employed, and some processing steps may be omitted.

Furthermore, the effects descried herein are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A signal processing apparatus including:

an acquisition unit that acquires an acoustic characteristic in a user's ear, isolated from the outside world;

an NC filter unit that generates sound data having a phase opposite to an ambient sound leaking into the user's ear;

a correction unit that corrects the sound data by using a correction filter; and a determination unit that determines a filter coefficient of the correction filter based on the acoustic characteristic.

(2)

The signal processing apparatus according to (1), wherein the acquisition unit acquires the acoustic characteristic based on a collected sound signal obtained by collecting measurement sound output into the ear.

(3)

The signal processing apparatus according to (1) or (2), wherein the determination unit determines the filter coefficient by using a trained model in which an acoustic characteristic is input and a filter coefficient is output.

(4)

The signal processing apparatus according to (3), wherein the determination unit determines the filter coefficient by using the trained model that has learned, as training data, an acoustic characteristic estimated at a user's eardrum position.

(5)

The signal processing apparatus according to any one of (1) to (4), wherein the determination unit determines the filter coefficient by using a trained model in which an acoustic characteristic and sound data are input and whether to correct the sound data is output.

(6)

The signal processing apparatus according to (5), wherein the determination unit determines the filter coefficient by using the trained model that has learned, as training data, given information labeled to indicate whether to perform correction based on a noise suppression ratio estimated based on an acoustic characteristic and sound data.

(7)

The signal processing apparatus according to any one of (1) to (6), wherein the determination unit determines the filter coefficient by using a trained model in which an acoustic characteristic, an acoustic characteristic measured in advance, and sound data are input and a noise suppression ratio is output.

(8)

The signal processing apparatus according to (7), wherein the determination unit determines the filter coefficient by using the trained model that has learned, as training data, a noise suppression ratio obtained based on both of an acoustic characteristic estimated at a user's eardrum position and sound data.

(9)

The signal processing apparatus according to any one of (1) to (8), wherein the determination unit determines the filter coefficient by using a trained model in which a collected sound signal collected by a microphone different from a microphone having measured the acoustic characteristic and sound data are input and a correction filter coefficient correcting a difference in filter coefficient based on an ambient sound in a user environment is output.

(10)

The signal processing apparatus according to (9), wherein the determination unit determines the filter coefficient by using the trained model that has learned, as training data, a filter coefficient correcting a difference in filter coefficient based on an acoustic characteristic estimated at a user's eardrum position.

(11)

The signal processing apparatus according to any one of (1) to (10), wherein the determination unit determines the filter coefficient by using a trained model in which an acoustic characteristic and sound data are input and an amount of NC effect is output.

(12)

The signal processing apparatus according to (11), wherein the determination unit determines the filter coefficient by using the trained model that has learned, as training data, an amount of effect based on an acoustic characteristic estimated at a user's eardrum position.

(13)

The signal processing apparatus according to any one of (1) to (12), wherein the determination unit determines the filter coefficient by using a trained model in which an amount of NC effect in an environment set according to a predetermined standard, sound data, and an acoustic characteristic of ambient sound in a user environment are input, and an amount of NC effect in the user environment is output.

(14)

The signal processing apparatus according to (13), wherein the determination unit determines the filter coefficient by using the trained model that has learned, as training data, an amount of NC effect based on sound data, a filter coefficient, and an acoustic characteristic of ambient sound in a user environment.

(15)

A signal processing method performed by a computer, the signal processing method including:

an acquisition step of acquiring an acoustic characteristic in a user's ear, isolated from the outside world;

an NC filter step of generating sound data having a phase opposite to an ambient sound leaking into the user's ear;

a correction step of correcting the sound data by using a correction filter; and a determination step of determining a filter coefficient of the correction filter based on the acoustic characteristic.

(16)

A signal processing program for causing a computer to perform:

an acquisition procedure of acquiring an acoustic characteristic in a user's ear, isolated from the outside world;

an NC filter procedure of generating sound data having a phase opposite to an ambient sound leaking into the user's ear;

a correction procedure of correcting the sound data by using a correction filter; and a determination procedure of determining a filter coefficient of the correction filter based on the acoustic characteristic.

(17)

A signal processing model production method including: determining whether to correct a filter coefficient based on an acoustic characteristic based on a collected sound signal collected by a microphone and determining a filter coefficient for performing optimal noise canceling; learning, in order to generate a noise canceling signal based on the determined filter coefficient, performing learning with an acoustic characteristic based on a collected sound signal collected in advance by a microphone and a correction filter coefficient for performing optimal noise canceling as inputs, and producing a model for performing optimal noise canceling.

(18)

A sound output device including an output unit that outputs sound from which noise is cancelled based on a signal provided from a signal processing apparatus, the signal processing apparatus determining a filter coefficient for performing optimal noise cancelling based on an acoustic characteristic based on a collected sound signal collected by a microphone of the sound output device, providing a signal generated based on the determined filter coefficient.

REFERENCE SIGNS LIST

1 SIGNAL PROCESSING SYSTEM
10 SIGNAL PROCESSING APPARATUS
20 HEADPHONES
30 TERMINAL DEVICE
100 COMMUNICATION UNIT
110 CONTROL UNIT
111 ACQUISITION UNIT
112 PROCESSING UNIT
1121 DETERMINATION UNIT
1122 NC FILTER UNIT
1123 CORRECTION UNIT
1124 GENERATION UNIT
1125 CORRECTION DETERMINATION UNIT
113 OUTPUT UNIT
200 COMMUNICATION UNIT
210 CONTROL UNIT
220 OUTPUT UNIT

The invention claimed is:

1. A signal processing apparatus, including:

an acquisition unit configured to acquire a first acoustic characteristic in a user's ear, isolated from an outside world;

an NC filter unit configured to generate sound data having a phase opposite to an ambient sound that leaks into the user's ear;

a correction unit configured to correct the sound data based on a correction filter; and a determination unit configured to determine a filter coefficient of the correction filter, based on a trained model in which the first acoustic characteristic, a second acoustic characteristic measured in advance, and the sound data are input, and a noise suppression ratio is output.

2. The signal processing apparatus according to claim 1, wherein the acquisition unit is further configured to acquire the first acoustic characteristic based on a collected sound signal, and the collected sound signal is obtained based on collection of measurement sound output into the user's ear.

3. The signal processing apparatus according to claim 1, wherein the determination unit is further configured to determine the filter coefficient, based on the trained model that has learned, as training data, a third acoustic characteristic at a user's eardrum position.

4. The signal processing apparatus according to claim 1, wherein the determination unit is further configured to determine the filter coefficient, based on the trained model in which whether to correct the sound data is output.

5. The signal processing apparatus according to claim 4, wherein the determination unit is further configured to determine the filter coefficient, based on the trained model that has learned, as training data, given information labeled to indicate whether to perform the correction by the noise suppression ratio, and the noise suppression ratio is estimated based on the first acoustic characteristic and the sound data.

6. The signal processing apparatus according to claim 1, wherein the determination unit is further configured to determine the filter coefficient, based on the trained model that has learned, as training data, the noise suppression ratio, and the noise suppression ratio is obtained based on both of a third acoustic characteristic at a user's eardrum position and the sound data.

7. The signal processing apparatus according to claim 1, wherein the determination unit is further configured to determine the filter coefficient, based on the trained model in which a collected sound signal collected by a first microphone different from a second microphone having measured the first acoustic characteristic is input, and a correction filter coefficient, that corrects a difference in the filter coefficient, based on the ambient sound in a user environment is output.

8. The signal processing apparatus according to claim 7, wherein the determination unit is further configured to determine the filter coefficient, based on the trained model that has learned, as training data, the correction filter coefficient, and the correction filter coefficient corrects the difference in the filter coefficient based on a third acoustic characteristic at a user's eardrum position.

9. The signal processing apparatus according to claim 1, wherein the determination unit is further configured to determine the filter coefficient based on the trained model in which an amount of noise canceling (NC) effect is output.

10. The signal processing apparatus according to claim 9, wherein the determination unit is further configured to determine the filter coefficient, based on the trained model that has learned, as training data, the amount of NC effect, and the amount of NC effect is based on a third acoustic characteristic at a user's eardrum position.

11. The signal processing apparatus according to claim 1, wherein the determination unit is further configured to determine the filter coefficient, based on the trained model in which a first amount of noise canceling (NC) effect in an environment set according to a specific standard, the sound data, and a third acoustic characteristic of ambient sound in a user environment are input, and a second amount of NC effect in the user environment is output.

12. The signal processing apparatus according to claim 11, wherein the determination unit is further configured to determine the filter coefficient, based on the trained model that has learned, as training data, the second amount of NC effect, and the second amount of NC effect is based on the sound data and the third acoustic characteristic of the ambient sound in the user environment.

13. A signal processing method, including:

acquiring a first acoustic characteristic in a user's ear, isolated from an outside world;

generating sound data having a phase opposite to an ambient sound leaking into the user's ear;

correcting the sound data based on a correction filter; and determining a filter coefficient of the correction filter, based on a trained model in which the first acoustic characteristic, a second acoustic characteristic measured in advance, and the sound data are input, and a noise suppression ratio is output.

14. A non-transitory computer-readable medium having stored thereon computer-executable instructions that, when executed by a computer, cause the computer to execute operations, the operations comprising:

acquiring a first acoustic characteristic in a user's ear, isolated from an outside world;

generating sound data having a phase opposite to an ambient sound leaking into the user's ear;

correcting the sound data based on a correction filter; and determining a filter coefficient of the correction filter, based on a trained model in which the first acoustic characteristic, a second acoustic characteristic measured in advance, and the sound data are input, and a noise suppression ratio is output.

* * * * *